(12) United States Patent
Loo et al.

(10) Patent No.: US 12,646,295 B2
(45) Date of Patent: Jun. 2, 2026

(54) SYSTEMS AND METHODS FOR EFFICIENT DATASET DISTILLATION USING NON-DETERMINISTIC FEATURE APPROXIMATION

(71) Applicant: Massachusetts Institute of Technology, Cambridge, MA (US)

(72) Inventors: Noel Loo, Cambridge, MA (US); Ramin Hasani, New York, NY (US); Alexander A. Amini, Brookline, MA (US); Daniela Rus, Weston, MA (US)

( * ) Notice: Subject to any disclaimer, the term of this patent is extended or adjusted under 35 U.S.C. 154(b) by 440 days.

(21) Appl. No.: 18/199,825

(22) Filed: May 19, 2023

(65) Prior Publication Data

US 2024/0212328 A1 Jun. 27, 2024

Related U.S. Application Data

(60) Provisional application No. 63/390,952, filed on Jul. 20, 2022.

(51) Int. Cl.
   *G06V 10/774* (2022.01)
   *G06V 10/776* (2022.01)
   *G06V 10/82* (2022.01)
(52) U.S. Cl.
   CPC .......... *G06V 10/774* (2022.01); *G06V 10/776* (2022.01); *G06V 10/82* (2022.01)
(58) Field of Classification Search
   CPC .... G06V 10/774; G06V 10/776; G06V 10/82; G06N 3/0464; G06N 3/047; G06N 3/048; G06N 3/09

(Continued)

(56) References Cited

U.S. PATENT DOCUMENTS

2022/0398262 A1* 12/2022 Derakhshani ........ G06N 3/0499

FOREIGN PATENT DOCUMENTS

CN 113569891 A * 10/2021 ........... G06F 18/214

OTHER PUBLICATIONS

Refinetti, Maria, Sebastian Goldt, Florent Krzakala, and Lenka Zdeborová. "Classifying high-dimensional gaussian mixtures: Where kernel methods fail and neural networks succeed." In International Conference on Machine Learning, pp. 8936-8947. PMLR, 2021.

(Continued)

*Primary Examiner* — Charlotte M Baker
(74) *Attorney, Agent, or Firm* — Barnes & Thornburg LLP

(57) ABSTRACT

Dataset distillation compresses large datasets into smaller synthetic coresets that retain performance with the aim of reducing storage and computational burdens of processing an original, entire dataset. The present disclosure provides an improved algorithm that uses a non-deterministic feature approximation of neural network Gaussian process (NNGP) kernels, or other trained kernels, that reduces a kernel matrix computation to O(|S|). When combined with a modified Platt scaling loss, the disclosed algorithm can provide at least a 100-fold speedup over a Kernel-Inducing Points (KIP) algorithm and can run on a single graphics processing unit. The disclosed Random Feature Approximation Distillation (RFAD) algorithm can perform competitively with other dataset condensation algorithms in accuracy over a range of large-scale datasets, both in kernel regression and finite-width network training. The disclosed techniques can be effective on tasks such as model interpretability and data privacy preservation.

20 Claims, 14 Drawing Sheets

(58) Field of Classification Search
USPC ........................................................ 382/156
See application file for complete search history.

(56) References Cited

OTHER PUBLICATIONS

Scholkopf B., et al., "Input space versus feature space in kernel-based methods," in IEEE Transactions on Neural Networks, vol. 10, No. 5, pp. 1000-1017, Sep. 1999, doi: 10.1109/72.788641.

Shankar, Vaishaal, Alex Fang, Wenshuo Guo, Sara Fridovich-Keil, Jonathan Ragan-Kelley, Ludwig Schmidt, and Benjamin Recht. "Neural kernels without tangents." In International conference on machine learning, pp. 8614-8623. PMLR, 2020.

Shleifer, Sam, and Eric Prokop. "Using small proxy datasets to accelerate hyperparameter search." arXiv preprint arXiv:1906.04887 (2019).

Snell, Jake, Kevin Swersky, and Richard Zemel. "Prototypical networks for few-shot learning." Advances in neural information processing systems 30 (2017).

Snelson, Edward, and Zoubin Ghahramani. "Sparse Gaussian processes using pseudo-inputs." Advances in neural information processing systems 18 (2005).

Sucholutsky, Ilia, and Matthias Schonlau. "Soft-label dataset distillation and text dataset distillation." In 2021 International Joint Conference on Neural Networks (IJCNN), pp. 1-8. IEEE, 2021.

Titsias, Michalis. "Variational learning of inducing variables in sparse Gaussian processes." In Artificial intelligence and statistics, pp. 567-574. PMLR, 2009.

Toneva, Mariya, Alessandro Sordoni, Remi Tachet des Combes, Adam Trischler, Yoshua Bengio, and Geoffrey J. Gordon. "An empirical study of example forgetting during deep neural network learning." arXiv preprint arXiv: 1812.05159 (2018).

Vinyals, Oriol, Charles Blundell, Timothy Lillicrap, and Daan Wierstra. "Matching networks for one shot learning." Advances in neural information processing systems 29 (2016).

Wang, Tongzhou, Jun-Yan Zhu, Antonio Torralba, and Alexei A. Efros. "Dataset distillation." arXiv preprint arXiv:1811.10959 (2018).

Wang, Tsun-Hsuan, Wei Xiao, Tim Seyde, Ramin Hasani, and Daniela Rus. "Interpreting neural policies with disentangled tree representations." arXiv preprint arXiv:2210.06650 (2022).

Williams, Christopher KI, and David Barber. "Bayesian classification with Gaussian processes." IEEE Transactions on pattern analysis and machine intelligence 20, No. 12 (1998): 1342-1351.

Xiao, Han, Kashif Rasul, and Roland Vollgraf. "Fashion-mnist: a novel image dataset for benchmarking machine learning algorithms." arXiv preprint arXiv:1708.07747 (2017).

Yaida, Sho. "Non-Gaussian processes and neural networks at finite widths." In Mathematical and Scientific Machine Learning, pp. 165-192. PMLR, 2020.

Yang, Greg. "Wide feedforward or recurrent neural networks of any architecture are gaussian processes." Advances in Neural Information Processing Systems 32 (2019).

Zandieh, Amir, Insu Han, Haim Avron, Neta Shoham, Chaewon Kim, and Jinwoo Shin. "Scaling neural tangent kernels via sketching and random features." Advances in Neural Information Processing Systems 34 (2021): 1062-1073.

Zhao, Bo, and Hakan Bilen. "Dataset condensation with distribution matching." In Proceedings of the IEEE/CVF Winter Conference on Applications of Computer Vision, pp. 6514-6523. 2023.

Zhao, Bo, and Hakan Bilen. "Dataset condensation with differentiable siamese augmentation." In International Conference on Machine Learning, pp. 12674-12685. PMLR, 2021.

Zhao, Shengyu, Zhijian Liu, Ji Lin, Jun-Yan Zhu, and Song Han. "Differentiable augmentation for data-efficient gan training." Advances in neural information processing systems 33 (2020): 7559-7570.

Zhuang, Juntang, Tommy Tang, Yifan Ding, Sekhar C. Tatikonda, Nicha Dvornek, Xenophon Papademetris, and James Duncan.

"Adabelief optimizer: Adapting stepsizes by the belief in observed gradients." Advances in neural information processing systems 33 (2020): 18795-18806.

Abadi, Martin, et al. "Deep learning with differential privacy." Proceedings of the 2016 ACM SIGSAC conference on computer and communications security (2016).

Aljundi, Rahaf, et al. "Gradient based sample selection for online continual learning." Advances in neural information processing systems 32 (2019).

Belouadah, Eden, and Adrian Popescu. "Scail: Classifier weights scaling for class incremental learning." Proceedings of the IEEE/CVF winter conference on applications of computer vision. 2020.

Bien, Jacob, and Robert Tibshirani. "Prototype selection for interpretable classification." (2011): 2403-2424.

Bohdal, Ondrej, Yongxin Yang, and Timothy Hospedales. "Flexible dataset distillation: Learn labels instead of images." arXiv preprint arXiv:2006.08572 (2020).

Borsos, Zalán, Mojmir Mutny, and Andreas Krause. "Coresets via bilevel optimization for continual learning and streaming." Advances in neural information processing systems 33 (2020): 14879-14890.

Castro, Francisco M., et al. "End-to-end incremental learning." Proceedings of the European conference on computer vision (ECCV). 2018.

Chen, Yutian, Max Welling, and Alex Smola. "Super-samples from kernel herding." arXiv preprint arXiv:1203.3472 (2012).

Chizat, Lenaic, Edouard Oyallon, and Francis Bach. "On lazy training in differentiable programming." Advances in neural information processing systems 32 (2019).

Cohen, M. B., Musco, C., & Musco, C. (2017). Input sparsity time low-rank approximation via ridge leverage score sampling. In Proceedings of the Twenty-Eighth Annual ACM-SIAM Symposium on Discrete Algorithms (pp. 1758-1777). Society for Industrial and Applied Mathematics.

Daniely, Amit, Roy Frostig, and Yoram Singer. "Toward deeper understanding of neural networks: The power of initialization and a dual view on expressivity." Advances in neural information processing systems 29 (2016).

Garriga-Alonso, Adrià, Carl Edward Rasmussen, and Laurence Aitchison. "Deep convolutional networks as shallow gaussian processes." arXiv preprint arXiv:1808.05587 (2018).

Ghorbani, Behrooz, et al. "When do neural networks outperform kernel methods?." Advances in Neural Information Processing Systems 33 (2020): 14820-14830.

Hampel, Frank R. "The influence curve and its role in robust estimation." Journal of the american statistical association 69.346 (1974): 383-393.

Har-Peled, S., & Mazumdar, S. (Jun. 2004). On coresets for k-means and k-median clustering. In Proceedings of the thirty-sixth annual ACM symposium on Theory of computing (pp. 291-300).

Hasani, Ramin, et al. "Response characterization for auditing cell dynamics in long short-term memory networks." 2019 International Joint Conference on Neural Networks (IJCNN). IEEE, 2019.

Hron, Jiri, et al. "Infinite attention: NNGP and NTK for deep attention networks." International Conference on Machine Learning. PMLR, 2020.

Hu, Wei, Zhiyuan Li, and Dingli Yu. "Simple and effective regularization methods for training on noisily labeled data with generalization guarantee." arXiv preprint arXiv:1905.11368 (2019).

Hutter, Frank, Lars Kotthoff, and Joaquin Vanschoren. Automated machine learning: methods, systems, challenges. Springer Nature, 2019.

Jacot, Arthur, Franck Gabriel, and Clément Hongler. "Neural tangent kernel: Convergence and generalization in neural networks." Advances in neural information processing systems 31 (2018).

Jubran, Ibrahim, Alaa Maalouf, and Dan Feldman. "Introduction to coresets: Accurate coresets." arXiv preprint arXiv:1910.08707 (2019).

Kabra, Mayank, Alice Robie, and Kristin Branson. "Understanding classifier errors by examining influential neighbors." In Proceedings of the IEEE conference on computer vision and pattern recognition, pp. 3917-3925. 2015.

Kaya, Mahmut, and Hasan Şakir Bilge. "Deep metric learning: A survey." Symmetry 11.9 (2019): 1066.

(56)  References Cited

OTHER PUBLICATIONS

Kim, Been, Rajiv Khanna, and Oluwasanmi O. Koyejo. "Examples are not enough, learn to criticize! criticism for interpretability." Advances in neural information processing systems 29 (2016).

Koh, Pang Wei, and Percy Liang. "Understanding black-box predictions via influence functions." In International conference on machine learning, pp. 1885-1894. PMLR, 2017.

Krizhevsky, Alex, and Geoffrey Hinton. "Learning multiple layers of features from tiny images." (2009): 7.

Lechner, Mathias, Ramin Hasani, Alexander Amini, Thomas A. Henzinger, Daniela Rus, and Radu Grosu. "Neural circuit policies enabling auditable autonomy." Nature Machine Intelligence 2, No. 10 (2020): 642-652.

LeCun, C. Cortes, and C. Burges. Mnist handwritten digit database. ATT Labs [Online]. Available: http://yann.lecun.com/exdb/mnist, 2, 2010.

Lee, Jaehoon, Yasaman Bahri, Roman Novak, Samuel S. Schoenholz, Jeffrey Pennington, and Jascha Sohl-Dickstein. "Deep neural networks as gaussian processes." arXiv preprint arXiv:1711.00165 (2017).

Lee, Jaehoon, Samuel Schoenholz, Jeffrey Pennington, Ben Adlam, Lechao Xiao, Roman Novak, and Jascha Sohl-Dickstein. "Finite versus infinite neural networks: an empirical study." Advances in Neural Information Processing Systems 33 (2020): 15156-15172.

Loo, Noel, et al. "Efficient dataset distillation using random feature approximation." Advances in Neural Information Processing Systems 35 (2022): 13877-13891.

Lorraine, Jonathan, Paul Vicol, and David Duvenaud. "Optimizing millions of hyperparameters by implicit differentiation." In International conference on artificial intelligence and statistics, pp. 1540-1552. PMLR, 2020.

Lucic, Mario, Matthew Faulkner, Andreas Krause, and Dan Feldman. "Training gaussian mixture models at scale via coresets." The Journal of Machine Learning Research 18, No. 1 (2017): 5885-5909.

Maclaurin, Dougal, David Duvenaud, and Ryan Adams. "Gradient-based hyperparameter optimization through reversible learning." In International conference on machine learning, pp. 2113-2122. PMLR, 2015.

Matthews, Alexander G. de G., et al. "Gaussian process behaviour in wide deep neural networks." arXiv preprint arXiv:1804.11271 (2018).

Milios, Dimitrios, Raffaello Camoriano, Pietro Michiardi, Lorenzo Rosasco, and Maurizio Filippone. "Dirichlet-based gaussian processes for large-scale calibrated classification." Advances in Neural Information Processing Systems 31 (2018).

Mirzasoleiman, Baharan, Jeff Bilmes, and Jure Leskovec. "Coresets for data-efficient training of machine learning models." In International Conference on Machine Learning, pp. 6950-6960. PMLR, 2020.

Netzer, Yuval, Tao Wang, Adam Coates, Alessandro Bissacco, Bo Wu, and Andrew Y. Ng. "Reading digits in natural images with unsupervised feature learning." (2011).

Nguyen, Timothy, Zhourong Chen, and Jaehoon Lee. "Dataset meta-learning from kernel ridge-regression." arXiv preprint arXiv:2011.00050 (2020).

Nguyen, Timothy, Roman Novak, Lechao Xiao, and Jaehoon Lee. "Dataset distillation with infinitely wide convolutional networks." Advances in Neural Information Processing Systems 34 (2021): 5186-5198.

Novak, Roman, Lechao Xiao, Jaehoon Lee, Yasaman Bahri, Greg Yang, Jiri Hron, Daniel A. Abolafia, Jeffrey Pennington, and Jascha Sohl-Dickstein. "Bayesian deep convolutional networks with many channels are gaussian processes." arXiv preprint arXiv:1810.05148 (2018).

Novak, Roman, Lechao Xiao, Jiri Hron, Jaehoon Lee, Alexander A. Alemi, Jascha Sohl-Dickstein, and Samuel S. Schoenholz. "Neural tangents: Fast and easy infinite neural networks in python." arXiv preprint arXiv:1912.02803 (2019).

Novak, Roman, Jascha Sohl-Dickstein, and Samuel S. Schoenholz. "Fast finite width neural tangent kernel." In International Conference on Machine Learning, pp. 17018-17044. PMLR, 2022.

Park, Daniel S., Jaehoon Lee, Daiyi Peng, Yuan Cao, and Jascha Sohl-Dickstein. "Towards nngp-guided neural architecture search." arXiv preprint arXiv:2011.06006 (2020).

Phillips, Jeff M. "Coresets and sketches." arXiv preprint arXiv:1601.00617 (2016).

Platt, John. "Probabilistic outputs for support vector machines and comparisons to regularized likelihood methods." Advances in large margin classifiers 10, No. 3 (1999): 61-74.

Rahimi, Ali, and Benjamin Recht. "Random features for large-scale kernel machines." Advances in neural information processing systems 20 (2007).

Rasmussen, Carl Edward, and Christopher KI Williams. Gaussian processes for machine learning. vol. 1. Cambridge, MA: MIT press, 2006.

Rebuffi, Sylvestre-Alvise, Alexander Kolesnikov, Georg Sperl, and Christoph H. Lampert. "icarl: Incremental classifier and representation learning." In Proceedings of the IEEE conference on Computer Vision and Pattern Recognition, pp. 2001-2010 (2017).

* cited by examiner

Figure 4:
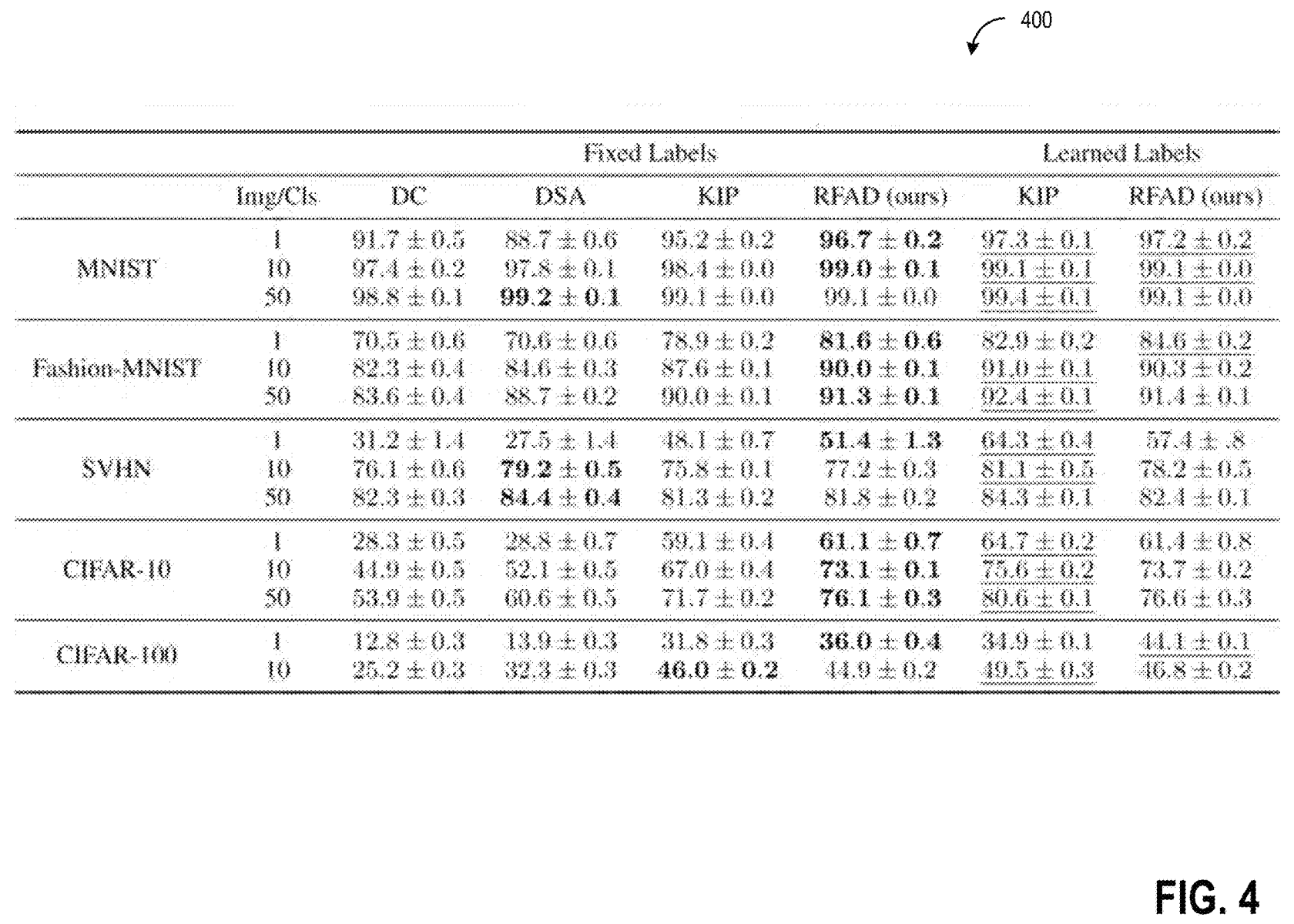

400

| | | Fixed Labels | | | | Learned Labels | |
|---|---|---|---|---|---|---|---|
| | Img/Cls | DC | DSA | KIP | RFAD (ours) | KIP | RFAD (ours) |
| MNIST | 1 | 91.7 ± 0.5 | 88.7 ± 0.6 | 95.2 ± 0.2 | 96.7 ± 0.2 | 97.3 ± 0.1 | 97.2 ± 0.2 |
| | 10 | 97.4 ± 0.2 | 97.8 ± 0.1 | 98.4 ± 0.0 | 99.0 ± 0.1 | 99.1 ± 0.1 | 99.1 ± 0.0 |
| | 50 | 98.8 ± 0.1 | 99.2 ± 0.1 | 99.1 ± 0.0 | 99.1 ± 0.0 | 99.4 ± 0.1 | 99.1 ± 0.0 |
| Fashion-MNIST | 1 | 70.5 ± 0.6 | 70.6 ± 0.6 | 78.9 ± 0.2 | 81.6 ± 0.6 | 82.9 ± 0.2 | 84.6 ± 0.2 |
| | 10 | 82.3 ± 0.4 | 84.6 ± 0.3 | 87.6 ± 0.1 | 90.0 ± 0.1 | 91.0 ± 0.1 | 90.3 ± 0.2 |
| | 50 | 83.6 ± 0.1 | 88.7 ± 0.2 | 90.0 ± 0.1 | 91.3 ± 0.1 | 92.4 ± 0.1 | 91.4 ± 0.1 |
| SVHN | 1 | 31.2 ± 1.4 | 27.5 ± 1.4 | 48.1 ± 0.7 | 51.4 ± 1.3 | 64.3 ± 0.4 | 57.4 ± 1.8 |
| | 10 | 76.1 ± 0.6 | 79.2 ± 0.5 | 76.8 ± 0.1 | 77.2 ± 0.3 | 81.1 ± 0.5 | 78.2 ± 0.5 |
| | 50 | 82.3 ± 0.3 | 84.4 ± 0.4 | 81.3 ± 0.2 | 81.8 ± 0.2 | 84.3 ± 0.1 | 82.4 ± 0.1 |
| CIFAR-10 | 1 | 28.3 ± 0.5 | 28.8 ± 0.7 | 50.1 ± 0.4 | 61.1 ± 0.7 | 64.7 ± 0.2 | 61.4 ± 0.8 |
| | 10 | 44.9 ± 0.5 | 52.1 ± 0.5 | 67.0 ± 0.4 | 73.1 ± 0.1 | 75.6 ± 0.2 | 73.7 ± 0.2 |
| | 50 | 53.9 ± 0.5 | 60.6 ± 0.5 | 71.7 ± 0.2 | 76.1 ± 0.3 | 80.6 ± 0.1 | 76.6 ± 0.3 |
| CIFAR-100 | 1 | 12.8 ± 0.3 | 13.9 ± 0.3 | 31.8 ± 0.3 | 36.0 ± 0.4 | 34.9 ± 0.1 | 41.1 ± 0.1 |
| | 10 | 25.2 ± 0.3 | 32.3 ± 0.3 | 46.0 ± 0.2 | 44.9 ± 0.2 | 49.5 ± 0.3 | 46.8 ± 0.2 |

| | Img/Cls | DC/DSA | KIP to NN | FastKIP to NN |
|---|---|---|---|---|
| MNIST | 1 | 91.7 ± 0.5 | 90.1 ± 0.1 | 94.4 ± 1.5* |
| | 10 | 97.8 ± 0.1 | 97.5 ± 0.0 | 98.5 ± 0.1* |
| | 50 | 99.2 ± 0.1 | 98.3 ± 0.1 | 98.8 ± 0.1 |
| Fashion-MNIST | 1 | 70.6 ± 0.6 | 73.5 ± 0.5* | 78.6 ± 1.3* |
| | 10 | 84.6 ± 0.3 | 86.8 ± 0.1 | 87.0 ± 0.5 |
| | 50 | 88.7 ± 0.2 | 88.0 ± 0.1* | 88.8 ± 0.4 |
| SVHN | 1 | 31.2 ± 1.4 | 57.3 ± 0.1* | 52.2 ± 2.2* |
| | 10 | 79.2 ± 0.5 | 75.0 ± 0.1 | 74.9 ± 0.4 |
| | 50 | 84.4 ± 0.4 | 80.5 ± 0.1 | 80.9 ± 0.3* |
| CIFAR-10 | 1 | 28.8 ± 0.7 | 49.9 ± 0.2 | 53.6 ± 1.2* |
| | 10 | 52.1 ± 0.5 | 62.7 ± 0.3 | 66.3 ± 0.5* |
| | 50 | 60.6 ± 0.5 | 68.6 ± 0.2 | 71.1 ± 0.4 |
| CIFAR-100 | 1 | 13.9 ± 0.3 | 15.7 ± 0.2 | 26.3 ± 1.1* |
| | 10 | 32.3 ± 0.3 | 28.3 ± 0.1 | 33.0 ± 0.3* |

FIG. 7

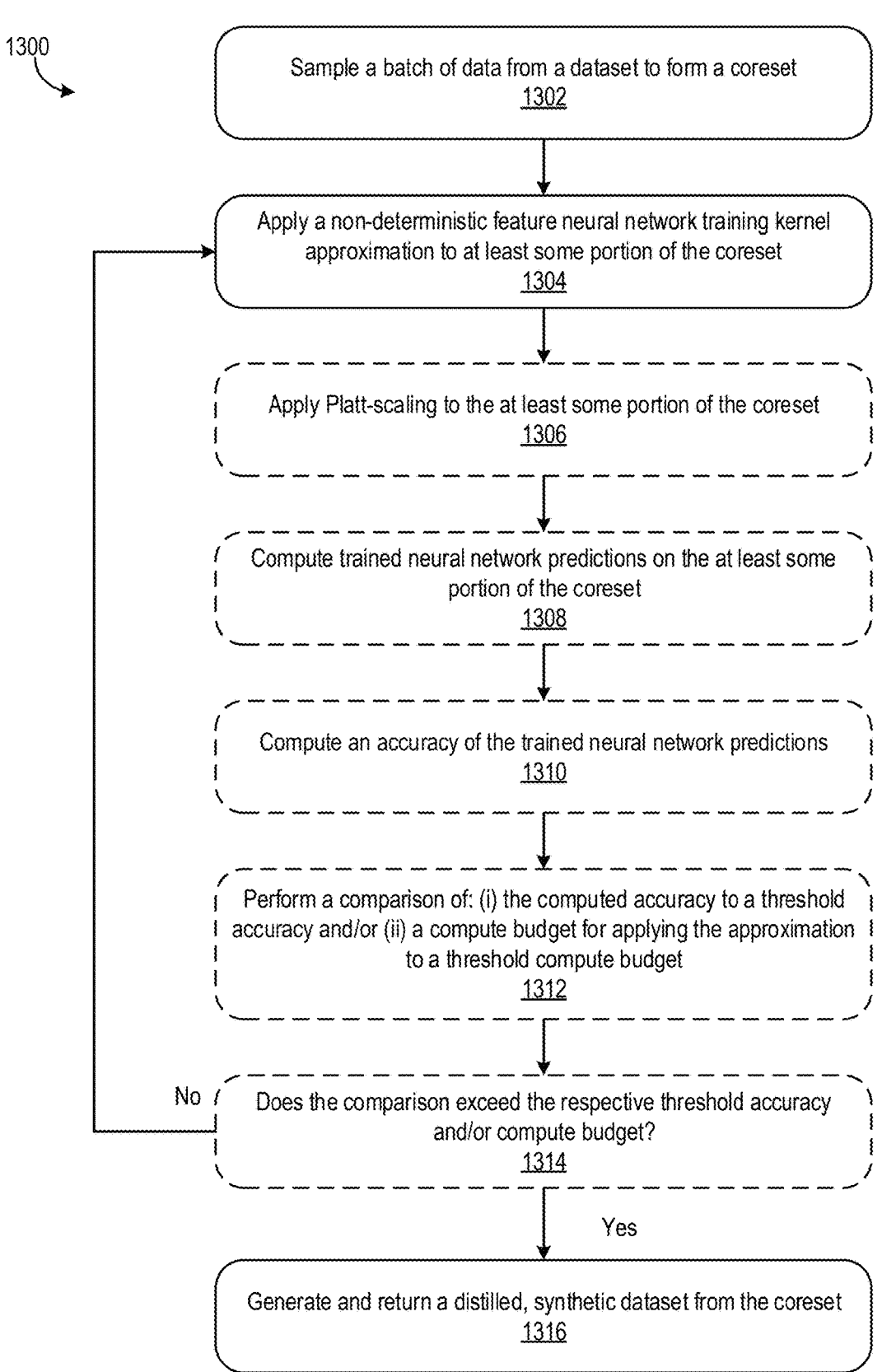

1300

Sample a batch of data from a dataset to form a coreset
1302

Apply a non-deterministic feature neural network training kernel approximation to at least some portion of the coreset
1304

Apply Platt-scaling to the at least some portion of the coreset
1306

Compute trained neural network predictions on the at least some portion of the coreset
1308

Compute an accuracy of the trained neural network predictions
1310

Perform a comparison of: (i) the computed accuracy to a threshold accuracy and/or (ii) a compute budget for applying the approximation to a threshold compute budget
1312

No

Does the comparison exceed the respective threshold accuracy and/or compute budget?
1314

Yes

Generate and return a distilled, synthetic dataset from the coreset
1316

FIG. 13

SYSTEMS AND METHODS FOR EFFICIENT DATASET DISTILLATION USING NON-DETERMINISTIC FEATURE APPROXIMATION

CROSS-REFERENCE TO RELATED APPLICATIONS

The present application claims priority to and the benefit of U.S. Provisional Application No. 63/390,952, entitled "Systems and Methods for Efficient Dataset Distillation using Non-Deterministic Feature Approximation" and filed on Jul. 20, 2022, the contents of which is incorporated herein by reference in its entirety.

GOVERNMENT RIGHTS

This invention was made with government support under N00014-18-1-2830 awarded by the Office of Naval Research (ONR), and FA8750-19-2-1000 awarded by the Air Force Research Laboratory (AFRL). The government has certain rights in the invention.

FIELD

The present disclosure relates to systems and methods performing dataset distillation, and more particularly relates to using an algorithm with non-deterministic feature approximation, among other features, that allows for transforming a variety of datasets into a compact, privacy-preserving, synthetic representation.

BACKGROUND

Coreset algorithms aim to summarize large datasets into significantly smaller datasets that still accurately represent the full dataset on downstream tasks. There are myriad applications of these smaller datasets including speeding up model training, reducing catastrophic forgetting, and enhancing interpretability. While most coreset selection techniques aim to select representative data points from the dataset, recent work has looked at generating synthetic data points instead, a process known as dataset distillation. These synthetic datasets have the benefit of using continuous gradient-based optimization techniques rather than combinatorial methods and are not limited to the set of images and labels given by the dataset, thus providing added flexibility and performance.

A large variety of applications benefit from obtaining an efficient dataset distillation algorithm. For instance, Kernel methods usually demand a large support set to generate good prediction performance at inference. This can be facilitated by an efficient dataset distillation pipeline. Moreover, distilling a synthetic version of sensitive data helps preserve privacy, such as by providing a support set to an end-user for downstream applications without disclosure of data. Lastly, for resource-hungry applications such as continual learning, neural architecture search, and/or automated machine learning, generation of a support set on which models can be fit efficiently is helpful.

Recently, a dataset distillation method called Kernel-Inducing Points (KIP) showed great performance in neural network classification tasks. KIP uses neural tangent kernel (NTK) ridge-regression to exactly compute the output states of an infinite-width neural network trained on the support set. Although the method established the state-of-the-art for dataset distillation in terms of accuracy, the computational complexity of KIP is very high due, at least in part, to the exact calculation of the NTK. The algorithm, therefore, has limited applicability.

Accordingly, there is a need for dataset distillation methods that are less complex than KIP, able to summarize large sets of data into smaller sets while accurately representing the full dataset and doing the summarization more quickly and efficiently than existing techniques, such as KIP.

SUMMARY

Dataset distillation compresses large datasets into smaller synthetic coresets that retain performance with the aim of reducing the storage and computational burden of processing the entire dataset. One known algorithm, Kernel Inducing Points (KIP), makes use of the correspondence between infinite-width neural networks and kernel-ridge regression. However, KIP is prohibitively slow due, at least in part, to the exact computation of the neural tangent kernel matrix, i.e., scaling $O(|S|^2)$, with $|S|$ being the coreset size.

The present disclosure improves the KIP algorithm by providing an improved algorithm that uses a non-deterministic feature approximation of the neural network Gaussian process kernel (NNGP), or other types of learned kernels, in turn reducing the kernel matrix computation to $O(|S|)$, with $|S|$ again being the coreset size. The disclosed techniques, and systems and/or computer products that utilize the techniques, can perform distillation of a dataset without exposing the dataset. That is, privacy of the data can be maintained by virtue of not exposing the dataset while carrying out the disclosed techniques and/or utilizing the disclosed systems and/or computer products. A further improvement introduced herein includes combining the disclosed algorithm and techniques with a modified Platt scaling loss, which can provide at least a 100-fold speedup over KIP and can run on a single graphics processing unit (GPU). Improving the processing of a computer by reducing the complexity of $O(|S|^2)$ to $O(|S|)$ is a significant enhancement of the performance of the computer itself.

As described further below, the Random Feature Approximation Distillation (RFAD) algorithm utilizes a new kernel inducing point method that can improve complexity from $O(|S|^2)$, (where $|S|$ is the support-set size) to $O(|S|)$. As a result, the disclosed techniques provide one or more advantages. For example, the disclosed techniques provide a fast, accurate, and scalable algorithm for dataset distillation in neural network classification tasks. The disclosed techniques also provide an improved time performance over the KIP algorithm, by over two orders-of-magnitude (or more) while retaining and/or improving its accuracy. This speedup can result, at least in part, from leveraging a non-deterministic-feature approximation of the NNGP by instantiating non-deterministic neural networks. Further speedup may also be provided, at least in part, by changing the optimization objective to Platt loss. The disclosed techniques can also provide for demonstrating the effectiveness of the RFAD algorithm in efficient dataset distillation tasks, including but not limited to enhancing model interpretability and/or privacy-preservation.

The disclosures provided for herein are directed to systems, methods, techniques, and an algorithm that can be implemented, for example, as a software package and can be applied for its purpose in real-life applications, such as ensuring the privacy of datasets and determining model hyper parameters. Using the disclosed technology, a synthetic representation of inputted data (e.g., an original, large, and/or sensitive dataset) can be generated, which can allow for the training of any machine learning model on that synthetic representation of inputted data, for tasks ranging from classification to regression, to be performed lossless, as if the model was trained on the original, large, and sensitive dataset. According to the disclosed techniques provided for herein, the synthetic representation of the inputted data can be tuned such that it may not be comprehensible to humans. Thus, the original dataset can be irreversibly transformed into a private version of itself that can be used for data-driven software workflows, such as machine learning, without compromising data privacy rights or concerns.

One embodiment of the disclosed techniques includes a method for performing dataset distillation that includes sampling a batch of data from a dataset to form a coreset and applying a non-deterministic feature neural network training kernel approximation to at least some portion of the coreset to define a modified coreset. The method further includes generating a distilled dataset from the modified coreset. The distilled dataset includes data that is synthetic and representative of the dataset.

The method can optionally include one or more of the following features. For example, the dataset can include a large dataset exceeding approximately $10^4$ samples, with each sample being of dimensionality of approximately $10^3$ or larger. The method can include applying Platt-scaling to the modified coreset to define a Platt-scaled coreset, and additionally, the action of generating the distilled dataset from the modified coreset can further include generating the distilled dataset from the Platt-scaled coreset. In at least some such embodiments, applying Platt-scaling to the modified coreset can include applying a cross entropy loss to the Platt-scaled coreset, and additionally, generating the distilled dataset from the modified coreset can further include generating the distilled dataset from the cross entropy loss applied Platt-scaled coreset.

The dataset can include a plurality of images, with the images having labels associated with them, and the action of sampling a batch of data from a dataset can include sampling a batch of images and labels from the dataset to form the coreset. Further, the method can include computing trained neural network predictions on the sampled batch of images. The method can also include an action of, after computing trained neural network predictions on the sampled batch of images, computing an accuracy of the trained network predictions on the sampled batch of images with respect to the labels associated with the respective images of the sampled batch of images. The method can further include comparing at least one of: the accuracy of the trained network predictions on the sampled batch of images to a threshold accuracy; or a compute budget used to perform the action of applying a non-deterministic feature neural network training kernel approximation to a threshold compute budget. If at least one of the threshold accuracy or the threshold compute budget is not exceeded, the method can include performing the action of applying a non-deterministic feature neural network training kernel approximation to at least some portion of the coreset again. This, in turn, can define a modified coreset. Alternatively, if both the threshold accuracy and the threshold compute budget is exceeded, the method can include closing the distilled dataset as a synthetic coreset that is representative of the dataset. In at least some embodiments, the dataset can be an original dataset and the threshold accuracy can be about 70 percent of performance of learning the original dataset or better. Alternatively, or additionally, in at least some embodiments a compute budget can be approximately 14 GPU hours or less.

In at least some embodiments, the action of applying a non-deterministic feature neural network training kernel approximation to at least some portion of the coreset to define a modified coreset can include using a kernel matrix computation that is $O(|S|)$. The methods of the present disclosure can be performed on a single graphics processing unit. The distilled dataset of the present disclosure can be, for example, privacy-protected data. In at least some embodiments, the distilled dataset can be minimized in size with respect to the dataset.

The speed of performing the method can be at least 100-fold faster than compared to performing the method by applying a neural tangent kernel (NTK) instead of the non-deterministic feature neural network training kernel to the at least some portion of the coreset. An amount of time for performing the method can be approximately in the range of about 1 hour to about 14 hours. The non-deterministic feature neural network training kernel can be at least one of a neural network Gaussian process (NNGP) kernel, a neural tangent kernel (NTK), or other learned training kernels. In at least some such embodiments, the non-deterministic feature neural network training kernel can be the NNGP.

One embodiment of a system for performing dataset distillation includes a processor configured to perform a process, with the process including: sampling a batch of data from a dataset to form a coreset; applying a non-deterministic feature neural network training kernel approximation to at least some portion of the coreset to define a modified coreset; and generating a distilled dataset from the modified coreset. The distilled dataset comprises data that is synthetic and representative of the dataset.

The system can optionally include one or more of the above-mentioned features and/or the following features. The non-deterministic feature neural network training kernel can be at least one of a neural network Gaussian process (NNGP) kernel, a neural tangent kernel (NTK), or other learned training kernels. In at least some such embodiments, the non-deterministic feature neural network training kernel can be the NNGP. The dataset can include a plurality of images, with the images having labels associated with them. Further, the process the processor is configured to perform further includes computing trained neural network predictions on the sampled batch of images.

In at least some embodiments, the process that the processor is configured to perform can also include, after computing trained neural network predictions on the sampled batch of images, computing an accuracy of the trained network predictions on the sampled batch of images with respect to the labels associated with the respective images of the sampled batch of images. Still further, the process can include comparing at least one of: the accuracy of the trained network predictions on the sampled batch of images to a threshold accuracy; or a compute budget used to perform the action of applying a non-deterministic feature neural network training kernel approximation to a threshold compute budget. If at least one of the threshold accuracy or the threshold compute budget is not exceeded, the process can further include performing the action of applying a non-deterministic feature neural network training kernel approximation to at least some portion of the coreset again. If both the threshold accuracy and the threshold compute budget is exceeded, the process can further include closing the distilled dataset.

One embodiment of a computer program, or a computer readable medium, for performing dataset distillation configures a computer to perform the following process. The process includes sampling a batch of data from a dataset to form a coreset and applying a non-deterministic feature neural network training kernel approximation to at least some portion of the coreset to define a modified coreset. The process also includes generating a distilled dataset from the modified coreset. The distilled dataset includes data that is synthetic and representative of the dataset.

The computer program can optionally include one or more of the above-mentioned features.

One embodiment of a method for performing dataset distillation for preserving data privacy includes sampling a batch of data from a dataset to form a coreset and applying a non-deterministic feature neural network training kernel approximation to at least some portion of the coreset to define a modified coreset. The method further includes generating a distilled dataset from the modified coreset. The distilled dataset includes data that is synthetic and representative of the dataset. Still further, the method includes returning the distilled dataset for preserving data privacy during run-time use in cloud infrastructures and local software as a service (Saas) applications.

The method can optionally include one or more of the above-mentioned features. For example, the method can also include returning the distilled dataset for use in data privacy-preserving machine-learning-model training. By way of further example, the non-deterministic feature neural network training kernel can be at least one of a neural network Gaussian process (NNGP) kernel, a neural tangent kernel (NTK), or other learned training kernels. In at least some such embodiments, the non-deterministic feature neural network training kernel can be the NNGP.

BRIEF DESCRIPTION OF THE DRAWINGS

This disclosure will be more fully understood from the following detailed description, taken in conjunction with the accompanying drawings, in which:

FIG. 4 illustrates a table of kernel distillation results from performing the disclosed RFAD algorithm and other dataset distillation algorithms;

FIG. 7 illustrates a table of resulting finite network transfer when training with gradient descent on coresets;

FIG. 13 is a flowchart of another process for generating a synthetic dataset from an original dataset using the disclosed RFAD algorithm.

DETAILED DESCRIPTION

Figure 1:
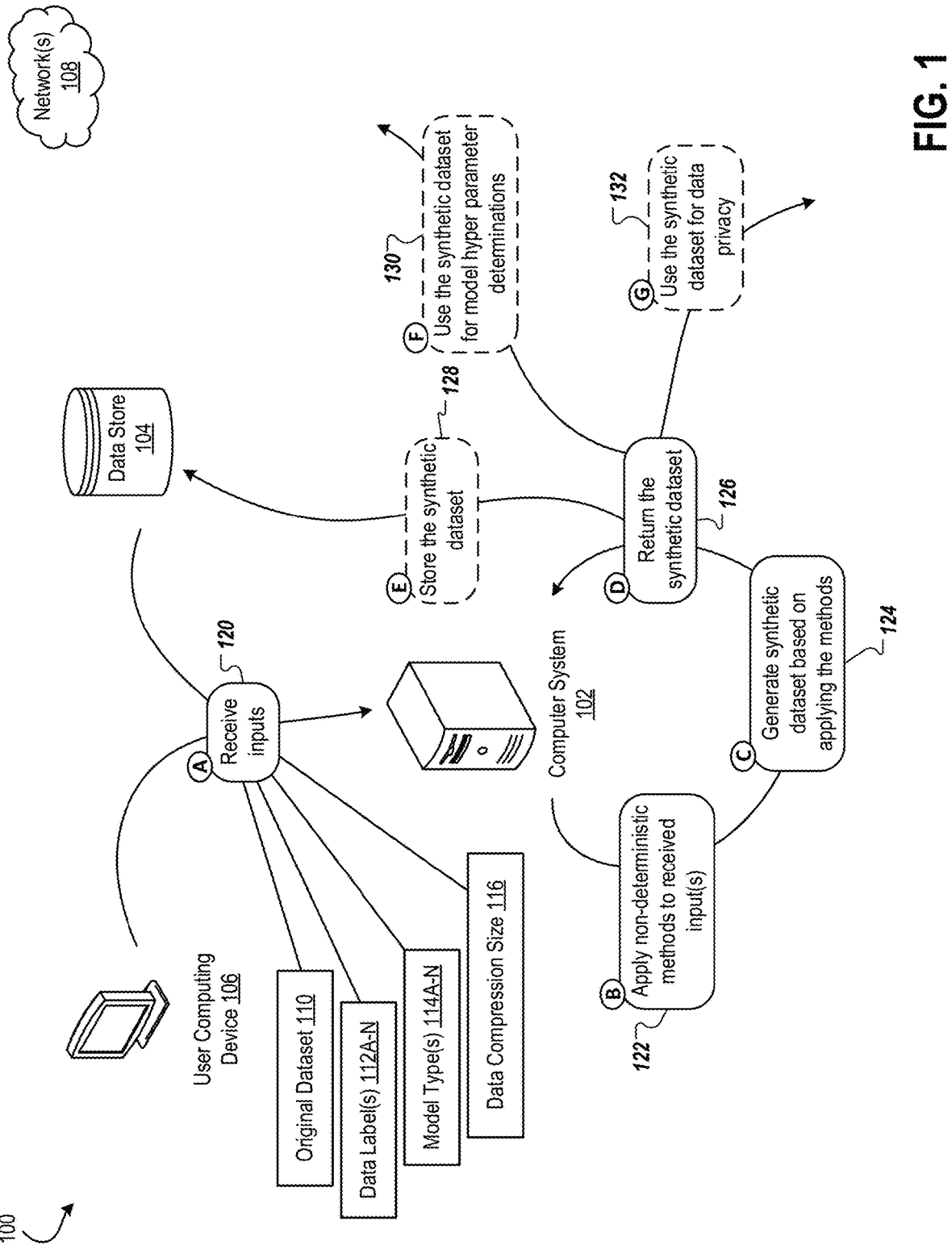
FIG. 1 is a conceptual diagram of a system for generating a synthetic dataset from an original dataset using the disclosed algorithm, termed the Random Feature Approximation Distillation (RFAD) algorithm.

Certain exemplary embodiments will now be described to provide an overall understanding of the principles of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, to the extent features, steps, actions, and the like are described as being "first," "second," "third," etc., such numerical ordering is generally arbitrary, and thus such numbering can be interchangeable unless otherwise known to those skilled in the art.

Approximating language, as used herein throughout the specification and claims, may be applied to modify any quantitative representation that could permissibly vary without resulting in a change in the basic function to which it is related. Accordingly, a value modified by a term or terms, such as "about" and "substantially" is not to be limited to the precise value specified. In some instances, the approximating language may correspond to the precision of an instrument for measuring the value. In some instances, "approximately" may be equal to +/−2% of the indicated value. Further, while the present disclosure generally refers to the present disclosures as being directed to an algorithm, the present disclosure provides for and contemplates that the algorithm is not so rigid as to be directed to a single implementation of the disclosed algorithm. Use of the terms "algorithm," "the disclosed algorithm," "the RFAD algorithm," and/or "the disclosed RFAD algorithm," or other similar terminology, is not intended to be limited to a single implementation of the algorithm. The present disclosure provides for and contemplates various permutations of the disclosed algorithm, and reference to the term "algorithm" can encompass such permutations and the like such that the term "algorithm" is applicable to multiple "algorithms" as provided for herein and/or as derivable by a person skilled in the art in view of the present disclosure.

Various symbols and other variables may be used throughout this disclosure. For example, H can represent input image height in pixels, W can represent input image width in pixels, D can represent network depth, C can represent number of convolutional channels (e.g., network width), N can represent number of models used during training, M can represent number of network features, which can be proportional to C, |T| can represent training set size, |B| can represent training batch size, and |S| can represent support set/coreset size, among other symbols and variables identified herein or otherwise known to those skilled in the art. In some implementations, C can additionally or alternatively, refer to a number of classes in a dataset. One or more other symbols and/or variables can be used as described herein.

Unless otherwise defined, all technical terms used herein have the same meaning as commonly understood by one of ordinary skill in the art to which this disclosure belongs. Additionally, like-numbered components across embodiments generally have similar features unless otherwise stated or a person skilled in the art would appreciate differences based on the present disclosure and his/her knowledge. Accordingly, aspects and features of every embodiment may not be described with respect to each embodiment, but those aspects and features are applicable to the various embodiments unless statements or understandings are to the contrary.

The present disclosure provides for more efficiently, both from a power-used and time spent perspective, distilling datasets. It also provides for techniques, and systems and/or computer products that utilize the techniques, that can perform distillation of a dataset without exposing the dataset. Accordingly, privacy related to the data from starting dataset can be maintained while performing the methods and/or operating the systems and/or computer products. The methods utilized, for example, by implementing an algorithm referred to herein as the Random Feature Approximation Distillation (RFAD) algorithm, provide particular efficiencies for large datasets, as well as for use in generating privacy-protected data from the initial dataset. More particularly, a neural network Gaussian Process (NNGP) kernel can be implemented in conjunction with non-deterministic feature approximation techniques to generate synthetic data that is representative of the initial dataset but generated in an efficient manner. The resulting synthetic data can be a smaller subset of data than the initial dataset and/or it can be privacy-protected data. Further, Platt-scaling can be used in conjunction with these techniques to further enhance the capabilities of the algorithm disclosed herein. The disclosed algorithm can also use other types of learned kernels as described herein to reduce original, large, and/or sensitive datasets to synthetic datasets. The synthetic datasets can further be used for training any type of machine learning model, performing other data processing and/or data analysis techniques, and/or preserving data privacy rights. Training machine learning models with the synthetic datasets can advantageously be performed faster and can produce similar and/or higher accuracy as training the models with the original, larger datasets. Accordingly, using non-deterministic feature approximation methods with the NNGP can speed up computations and reduce processing power, which further reduces computational costs and increases computing efficiency. The disclosed techniques may use a single graphics processing unit (GPU) rather than several GPUs working in parallel, the latter of which can be common for other techniques, such as KIP algorithms.

Notably, as provided for in the present disclosure, while the term "random" is used in conjunction with the RFAD algorithm, in actuality the distillation being performed is non-deterministic more so than random. Accordingly, references made herein to "random feature approximation," or where "R" is used to represent "random," the term non-deterministic can also be used to accurately describe how the disclosed algorithm operates.

Before describing the systems and methods of the present disclosure, it may be helpful to provide an overview of previous work, as well as an understanding of some of the underlying techniques and methods utilized by the systems and methods of the present disclosure.

Coresets and Dataset Distillation

Coresets are a subset of data that ensure models trained on them show competitive performance compared to models trained directly on data. Standard coreset selection algorithms may use importance sampling to find coresets. While technically coresets can be as big as a full dataset, more typically coresets can be subsets of the full dataset. However, there may be instances where applications of the present disclosure can be implemented across an entirety of the full dataset, for example to provide for privacy across the entire dataset. Further, where synthetic data is part of the coreset, it may be that the coreset is larger than the original dataset. For example, there may be instances in which the coreset is synthetic and larger than the original dataset, with the larger, synthetic dataset being privacy-enhanced.

As provided for herein, a dataset that is used in conjunction with disclosed techniques, systems, and/or computer products, such as a dataset that is a starting dataset because it is the first dataset with which the techniques, systems, and/or computer products are used, can be any type of dataset understood by a person skilled in the art. The dataset can be an original dataset, a large dataset, and/or a sensitive dataset. The dataset or starting dataset can include synthetic data or other data that was modified or otherwise treated prior to the introduction of the dataset to the disclosed techniques, systems, and/or computer products.

Once the starting dataset, also referred to as a dataset or an original dataset (though as described herein an original dataset can also be a subset of possible starting datasets), is sampled to form a coreset, a non-deterministic feature neural network training kernel can be applied to at least some portion of the coreset to define a modified coreset. Accordingly, in the present disclosure, a modified coreset can be any coreset to which a non-deterministic feature neural network training kernel approximation is applied. The modified coreset can result from and/or be defined by the application of any non-deterministic feature neural network training kernel approximation to an earlier, and sometimes an original and/or starting, dataset.

More recently, aligned with coreset selection methods, other algorithms have been developed to distill a synthetic dataset from a given dataset, such that fitting to this synthetic set can provide for performance on par with training on the original dataset. To this end, these dataset condensation (or distillation) algorithms can use gradient matching, differentiable siamese augmentation, and/or matching distributions. Dataset distillation can also be applied to labels in addition to or instead of images. For example, an algorithm called Kernel Inducing Points (KIP) can be used to distill synthetic datasets by using neural tangent kernel ridge-regression (KRR) to compute outputs of an infinite-width neural network trained on a support set, bypassing the need to compute gradients or back-propagate on any finite network. As an illustrative example, let $X_T$, $y_T$ correspond to the images and one-hot vector labels on the training dataset and let $X_S$, $y_S$ be the corresponding images and labels for the support set, which are aimed to be optimized. The outputs of a trained neural network can be $f(X_T)=K_{TS}(K_{SS}+\lambda I)^{-1}y_S$, with K being the kernel matrices calculated using the NTK, with T×S or S×S entries, for $K_{TS}$ and $K_{SS}$, respectively. $\lambda$ is a small regularization parameter. KIP then can optimize $$L_{MSE} = \|y_T - f(X_T)\|_2^2$$

directly. A bottleneck to this approach, however, is the computation of these kernel matrices, which may require O(TS*HWD) time and memory. This necessitates the use of hundreds of GPUs working in parallel. Additionally, the use of the Mean Squared Error (MSE) loss may be suboptimal at least since $L_{MSE}$ may not be well suited for resolving some technical hurdles described further in reference to FIG. 3. KIP, similar to other predecessor algorithms, however, can be computationally expensive. The present disclosures, on the other hand, provides for a new method that significantly improves complexity as compared to KIP and other algorithms.

In machine learning, kernel methods are a class of techniques that can make use of a kernel function to fit and/or learn data. The kernel function, sometimes referred to as "the kernel," can define how a machine learning method measures closeness of data points, with the kernel assigning a high score to similar data points and a low score to dissimilar ones. Various choices of kernels exist, including but not limited to exponential kernels, linear kernels, and polynomial kernels. The disclosed techniques can utilize neural network training kernels, which are classes of kernels that can approximate training of neural networks. Neural network training kernels can include, but are not limited to, neural network Gaussian process kernels (NNGP), which corresponds to fitting an infinite width Bayesian neural network (e.g., a neural network with uncertainties), neural tangent kernels (NTK), which can correspond to fitting an infinite width neural network with gradient descent (e.g., no uncertainties), and learned/data dependent NTK, which can correspond to finite-width neural tangent kernels that may be learned during training.

Infinite Width Neural Networks

Single-layer infinite-width non-deterministically initialized neural networks correspond to Gaussian Processes (GPs), which can allow for closed-form exact training of Bayesian neural networks for regression. More recently, this has been extended to deep fully-connected networks, convolutional networks, attention-based networks, and even arbitrary neural architectures, with the corresponding GP kernel being the NNGP. Likewise, for infinite-width neural networks trained with gradient descent, the training process can be simplified, corresponding to kernel ridge regression when trained with MSE loss with the corresponding kernel being the NTK. These two kernels may be closely related, as the NNGP forms the leading term of the NTK, representing the effect of network initialization. Calculation of these kernels typically can scale O(HWD) for convolutional architectures, with H, W being the image height and width, and D being the network depth, and O($H^2W^2D$) for architectures with global average pooling. This, combined with the necessity of computing and inverting the N×N kernel matrix for kernel ridge regression, can make these methods intractable for large datasets. In the present disclosure, samples can be taken from a GP network, selecting different distributions, with the distributions being able to be arbitrarily defined, i.e., they are non-deterministic.

Non-Deterministic Feature Methods

Every kernel can correspond to a dot product for some feature map: $k(x, x')=\phi(x)^T\phi(x')$. Non-deterministic feature methods can aim to approximate the feature vector with a finite-dimensional non-deterministic feature vector, such as Random Fourier Features. As provided for herein, this can limit a rank of the kernel matrix, enabling faster matrix inversion, and thus allowing for scaling kernel methods to large datasets. Further, employing non-deterministic feature methods by way of applying an applicable kernel as provided for herein, can allow for distillation of a dataset to be performed without exposing the dataset. That is, the techniques disclosed herein provide for privacy. Still further, the application of a non-deterministic feature neural network training kernel approximation can define a first modified coreset.

Synthetic data can be defined as output from the dataset distillation techniques described herein, including datasets that have been created by the output of an algorithm that takes in an input dataset and generates a modified and/or synthetic version of the same dataset. Examples include, but are not limited to, inputting in a dataset and outputting a condensed, distilled version, and/or outputting a private version of the dataset. Therefore, the disclosed techniques receive an input dataset and then creates a version of that specific dataset.

Now referring to the figures, FIG. 1 is a conceptual diagram of a system 100 for generating a synthetic dataset from an original dataset using the disclosed algorithm. A computer system 102 can communicate (e.g., wired, wirelessly) with at least a data store 104 and/or a user computing device 106 via network(s) 108. The computer system 102 can be any type of computing system, computing device, computer, laptop, tablet, edge computing device, mobile phone, smartphone, network of devices/systems, and/or cloud-based system. The user computing device 106 can be any type of mobile device, mobile phone, computer, laptop, tablet, smartphone, or other computing device. The data store 104 can be any type of data repository, database, and/or cloud-based storage system. In some implementations, one or more of the components 102, 104, and 106 can be part of a same computing system and/or a same network of computing systems and/or devices.

The computer system can receive inputs in block A (120). The inputs can be received from the user computing device 106 and/or the data store 104. The inputs can include, but are not limited to, an original full-size dataset 110, one or more data labels 112A-N corresponding to data in the dataset 110, one or more model types 114A-N for which resulting output from the disclosed techniques can be used for, and/or a data compression size 116 indicating a desired size of the resulting output from the disclosed techniques (e.g., a size of a resulting distilled, synthetic dataset).

As an illustrative example, the inputs can be provided as user input at the user computing device 106 by a relevant user. The user may desire to distill a large set of training image data to a synthetic set of image data to be used for training one or more user-defined models. The user can therefore provide input at his or her computing device 106, which are then transmitted to the computer system 102 in block A (120).

As another illustrative example, the inputs can be previously determined by the user at the user computing device 106 or another relevant user at another computing device. The previously-determined inputs can then be stored at the data store 104 and retrieved by the computer system 102 in block A (120) at another time. In still other instances, in lieu of or in addition to a user determining the inputs, the inputs can be provided by and/or to the user. As such, in at least some instances, a user may not determine one or more of the inputs that is provided.

The computer system 102 can apply one or more non-deterministic methods to the received input(s) in block B (122). The computer system 102 can accordingly generate a synthetic dataset based on applying the non-deterministic method(s) (block C, 124). Refer to the disclosure below for further details (e.g., refer to FIGS. 3 and 13).

The computer system 102 can return the synthetic dataset in block D (126). For example, the computer system 102 can optionally store the synthetic dataset in the data store 104 (block E, 128). Additionally, or alternatively, the computer system 102 can optionally use the synthetic dataset to model hyper parameter determinations (block F, 130). In some implementations, the computer system 102 can transmit the synthetic dataset to the user computing device 106 and the user computing device 106 can be configured to perform block F (130). Additionally, or alternatively, the computer system 102 can optionally use the synthetic dataset for data privacy use cases described throughout this disclosure (block G, 132). The dataset distillation techniques described herein can be used for preserving data privacy in cloud infrastructures and local software as a service (SaaS) applications, as some non-limiting examples. In some implementations, the computer system 102 can transmit the synthetic dataset to the user computing device 106 and the user computing device 106 can be configured to perform block G (132). The disclosed techniques can also be used for federated learning. For example, when many devices across various locations are being used to train and implement a machine learning model, the disclosed data distillation techniques can be used to fine-tune models, train models, and/or protect privacy of data used with the models. Moreover, the disclosed techniques can be used for a variety of types of follow-up scaling with real-world data.

Figures 2A, 2B, 2C:
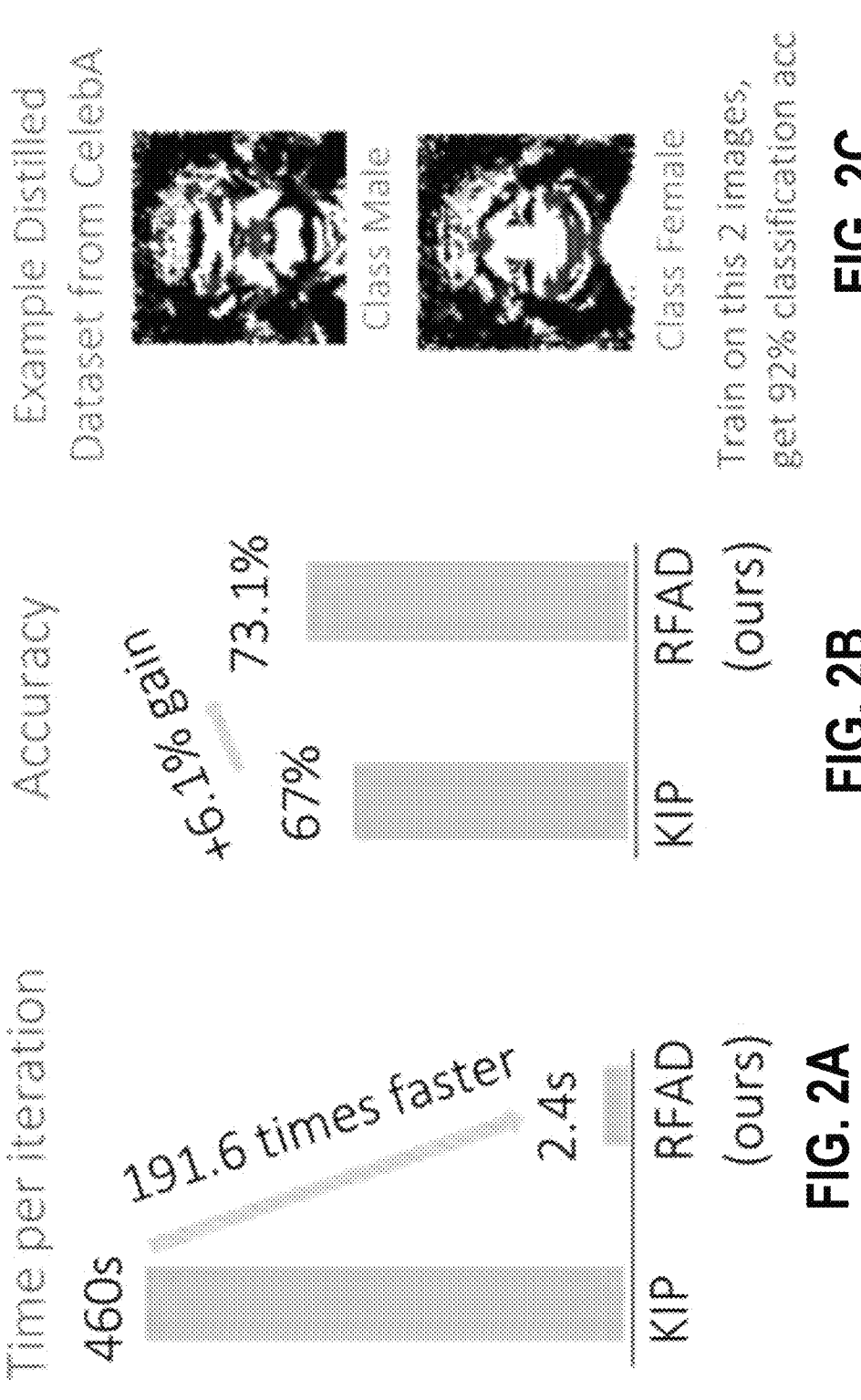
FIG. 2A illustrates a comparison between a time per iteration for a Kernel-Inducing Points (KIP) algorithm performing dataset distillation on a known dataset as compared to a time per iteration of the disclosed algorithm performing dataset distillation on the same known dataset.
FIG. 2B illustrates a comparison between accuracy for the KIP algorithm performing dataset distillation on the known dataset as compared to accuracy of the disclosed RFAD algorithm on the same known dataset.
FIG. 2C provides information and illustrations of data from the known dataset of FIGS. 2A and 2B.

FIGS. 2A-2B illustrate a comparison between a time per iteration for a KIP algorithm performing dataset distillation on a known dataset as compared to a time per iteration of the disclosed RFAD algorithm, performing dataset distillation on the same known dataset. Information about the known dataset is provided for in FIG. 2C, and is likewise known to those skilled in the and/or to people accessing the CelebA dataset. As shown in the illustrative example of FIG. 2A, the time per iteration for the KIP algorithm is approximately 460 seconds as compared to the time per iteration of the disclosed RFAD algorithm, which is approximately 2.4 seconds. Data distillation is being performed on the same known dataset, illustrating that the RFAD algorithm can be at least about 191.6 times faster than the KIP algorithm. RFAD therefore can provide over 100-fold speedup over the KIP algorithm, while exceeding its performance on the dataset, which is an illustrative example of distilled synthetic sets of one image per class.

The significantly faster performance of the RFAD algorithm does not come at a cost of accuracy either. As shown in FIG. 2B, accuracy of the RFAD algorithm also may increase. For example, in at least some instances it has been shown that accuracy can increase by approximately 6.1% using the RFAD algorithm, further supporting the conclusion that the disclosed techniques are comparable to, if not better than, the KIP algorithm as it relates to accuracy. More generally, the methods disclosed herein perform competitively with, and typically better than, the KIP algorithm and other dataset condensation algorithms in accuracy over a range of large-scale datasets, both in kernel regression and finite-width network training. The effectiveness of the disclosed techniques has been demonstrated on tasks involving model interpretability and privacy preservation, although a person skilled in the art may also appreciate a myriad of other possible use cases in view of the present disclosures.

Figure 3:
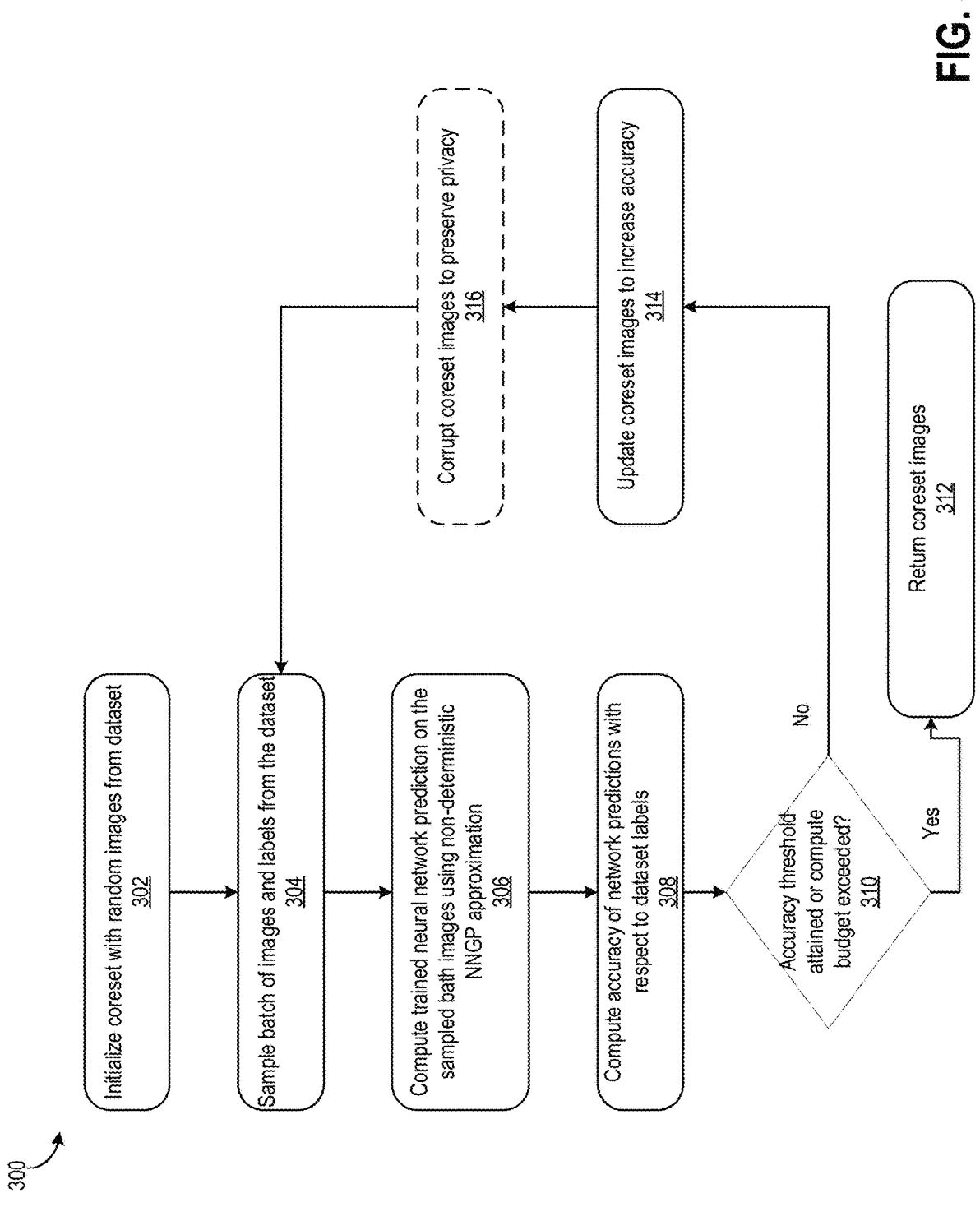
FIG. 3 is a flowchart of a process for generating a synthetic dataset from an original dataset using the disclosed RFAD algorithm.

FIG. 3 is a flowchart of a process 300 for generating a synthetic dataset from an original dataset using the disclosed RFAD algorithm. The process 300 can be performed by the computer system 102 described in reference to FIG. 1. The process 300 can also be performed by one or more other types of computing systems, edge computing devices, network of devices/servers/computing systems, and/or cloud-based systems/servers. For illustrative purposes, the process 300 is described from the perspective of a computer system.

Unlike the KIP algorithm, the disclosed techniques provide for replacing the NTK used in kernel regression with an NNGP. This change alone yields a speed up, at least in part because the NNGP can be less computationally intensive to compute. Other aspects of the present disclosure also provide for faster processing. The NNGP also can provide for a simple non-deterministic feature approximation. Attempting to implement a simple non-deterministic feature approximation on an NTK, which have specific parameters on which they are run, can run significantly slower than the techniques described herein for using a non-deterministic feature approximation with an NNGP. This is at least in part because the NNGP only has to lock at a final layer, not the gradients that are used by an NTK. One or more advantages of a non-deterministic feature approximation are described further below.

Firstly, it is denoted that in the computation of NTK ($\Theta$) and NNGP (K) forms the leading term. For fully connected (FC) layers, which can be the typical final layer in a neural network architecture, the remaining terms can be suppressed by a matrix of expected derivatives with respect to activations, $\dot{K}$, as observed by the recursion yielded from the computation of the NTK for an FC network: $\Theta^l = K^l + \dot{K}^l \Theta^{l-1}$.

For Rectified Linear Unit (ReLU) activations, the entries in this derivative matrix can be upper bounded by 1, so the remaining terms may have a decaying contribution. The disclosed techniques also provide good performance under the NTK and for finite-networks trained with gradient descent, as described further below.

Secondly, the NNGP can be replaced with an empirical NNGP using the disclosed RFAD algorithm. When sampling from a Gaussian process f~GP(0, K), it suggests a natural finite feature map corresponding to scaled draws from the $$GP: \hat{\phi}(x) = \frac{1}{\sqrt{N}} [f_1(x), \ldots , f_N(x)]^T.$$

For most GPs, this insight may not be relevant, as sampling from a GP typically can require a Cholesky decomposition of the kernel matrix, requiring its computation in the first place. However, in the case of the NNGP, approximate samples of f can be generated by instantiating non-deterministic neural networks, $f_i(x) = f_{\theta_i}(x)$, $\theta_i \sim p(\theta)$, for some initialization distribution $p(\theta)$.

Moreover, with a given neural network, $f_i$ can be defined to be a vector of dimension M by having a network with multiple output heads, meaning that with N networks, there can be N M features. By way of non-limiting example, the following parameters can be used: N=8, M=4096, giving 32,768 total features. For the convolutional architectures that can be considered in some non-limiting examples, this can correspond to C=256 convolutional channels per layer. Even with this relatively large number of features, a significant computation speedup over exact calculation may be observed, as described below (refer to FIG. 5).

To sample f~GP(0, K), non-deterministic infinite width neural nets can be instantiated. However, in practice for at least some embodiments, only finite ones can be sampled. This discrepancy can incur an O(1/C) bias to the provided kernel matrix entries, with C being the width relevant parameter (i.e., convolutional channels). An O(1/(NC)) variance of the mean of the non-deterministic features can exist, meaning that, in practice, the variance can dominate the computation over bias. That the finite-width bias does not significantly affect performance can be verified, as further described below, showing that reasonable performance can be achieved with as little as one convolution channel.

As denoted earlier, $L_{MSE}$ may not be well suited for classification tasks in dataset distillation settings. For example, over-influence of already correctly classified data points can cause this conclusion. Consider two-way classification, with the label 1 corresponding to the positive class and −1 corresponding to the negative class. Let $x_1$ and $x_2$ be items in the training set whose labels are both 1. Let $f_{KRR}(x) = K_{x,S}(K_{SS} + \lambda I)^{-1} y_S$ be the KRR output on x given support set $X_S$. If $f_{KRR}(x_1) = 5$ and $f_{KRR}(x_1) = -1$, then the resulting MSE error on $x_1$ and $x_2$ would be 16 and 4, respectively. Notably, $x_1$ incurs a larger loss, and results in a larger gradient on $X_S$ than $x_2$, despite being correctly classified and $x_2$ being incorrectly classified. In the heavily constrained dataset distillation setting, fitting both data-points simultaneously may not be possible, which can lead to underfitting of the data in terms of classification to better fit already-correctly labeled datapoints in terms of regression.

As another example, probabilistic interpretation of MSE for classification can cause the above-mentioned conclusion. This may prevent regression from being used directly in calibration-sensitive environment, which may necessitate the use of transformation functions in tasks such as GP classification.

The present disclosure can counter these above-mentioned two issues through use of a modified version of Platt scaling. More specifically, a cross entropy loss can be applied to the labels instead of an MSE one: $L_{platt} = x-$entropy$(y_T, f(X_T)/\tau)$, where t is a positive learned temperature scaling parameter. Unlike typical Platt scaling, $\tau$ can be learned jointly with the support set instead of post-hoc tuning on a separate validation set. $f(X_T)$ can still be calculated using the same KRR formula. Accordingly, this corresponds to training a network using MSE loss, but at inference, scaling the outputs by $\tau^{-1}$ and applying a softmax to get a categorical distribution. Unlike typical GP classification, the variance of predictions can be ignored, taking only the mean instead.

The combination of these techniques, namely: (1) using the NNGP instead of NTK; (2) applying a non-deterministic-feature approximation of NNGP; and (3) Platt-scaling, result in the RFAD algorithm, which is given in Algorithm 1 demonstrated below. In some implementations, less than all the techniques (1), (2), and (3) can be utilized and still may result in an improved algorithm that performs with the advantages described herein. In other words, not all three techniques (1), (2), and (3) are necessarily required to achieve improved results described herein. The RFAD algorithm also may not be limited to only being an algorithm that implements all three techniques (1), (2), and (3). Algorithm 1 can be implemented by a computer system (e.g., the computer system 102 in FIG. 1) to cause the computer system to generate synthetic data that is representative of an original data inputted into the algorithm. As described herein, the synthetic data may be privacy-protected data and/or may be made synthetic on other ways, such as minimizing a size of the dataset.

---

Algorithm 1
Algorithm 1 Dataset distillation by non-deterministic NNGP features

Require: Training set and labels $X_T$, $y_T$, Randomly initialized coreset and labels $X_S$, $y_S$, Random
    network count N, Random network output dimension M, Batch size |B|, Random network
    initialization distribution, $p(\theta)$, Regularization coefficient, $\lambda$, Learning rate $\eta$,
    while loss not converged do
        Sample batch from the training set $X_B$, $y_B \sim p(X_T, y_T)$
        Sample N random networks each with output dimension M from $p(\theta)$: $\theta_1, \ldots \theta_N \sim p(\theta)$
        Compute random features for batch with random nets:

$$\hat{\Phi}(X_B) \leftarrow \frac{1}{\sqrt{NM}} \left[ f_{\theta_1}(X_B), \ldots , f_{\theta_N}(X_B) \right]^T \in \mathbb{R}^{|NM| \times |B|}$$

-continued

---

Algorithm 1
Algorithm 1 Dataset distillation by non-deterministic NNGP features

---

Compute random features for support set with random nets:

$$\hat{\Phi}(X_S) \leftarrow \frac{1}{\sqrt{NM}} \left[ f_{\theta_1}(X_S), \dots, f_{\theta_N}(X_S) \right]^T \in \mathbb{R}^{|NM| \times |S|}$$

Compute kernel matrices: $K_{BS} \leftarrow \hat{\Phi}(X_B)^T \hat{\Phi}(X_S)$
$\hat{K}_{SS} \leftarrow \hat{\Phi}(X_S)^T \hat{\Phi}(X_S)$
Calculate trained network output on batch: $\hat{y}_B \leftarrow \hat{K}_{BS}(\hat{K}_{BS} + \lambda I_{|S|})^{-1} y_S$
Calculate loss: $\mathcal{L} = \mathcal{L}(y_B \hat{y}_B)$ Update coreset: $X_S \leftarrow X_S - \eta \frac{\partial \mathcal{L}}{\partial X_S}, y_S \leftarrow Y_S - \eta \frac{\partial \mathcal{L}}{\partial y_S}$

--- end while

---

As shown in the Algorithm 1, various inputs may be received (refer to the "Require" section in Algorithm 1 indicating training set and labels, random network initialization distribution, and randomly initialized coreset and labels). The inputs can include but are not limited to a full dataset and corresponding labels, a desired compression size (e.g., in the context of receiving a full image data set, indicating how many images are desired in a final, synthetic, smaller dataset), and/or an indication of what type of model(s) for which to distill the full dataset (e.g., 1-layer model, 3-layer model). The inputs are then passed through the algorithm (refer to the "while" loop in Algorithm 1) to output a condensed synthetic dataset (e.g., coreset). The algorithm actions of computing random features for batch with random nets, computing random features for support set with random nets, and computing kernel matrices can be performed as non-deterministic techniques to achieve the faster time per iteration advantages of the RFAD algorithm that are described throughout this disclosure.

Referring to the process 300 in FIG. 3, the computer system can initialize a coreset with random images from a dataset (block 302). A batch of images and labels can then be sampled from the dataset (block 304). Any variety of requirements and/or parameters can be used to determine which images are sampled. For example, a relevant user can implement one or more requirements and/or parameters specific to their particular use case. In some implementations, no requirements and/or parameters may be used. Instead, the images can be randomly sampled.

Subsequently, a trained neural network prediction can be computed on the sampled batch images (block 306). This can be achieved, for example, by the computer system implementing non-deterministic NNGP feature approximation as described herein. The accuracy of the network predictions can be computed by the computer system with respect to the sampled dataset labels (block 308).

At this point, a decision can be made by the computer system. The computer system can determine whether a threshold accuracy is attained/reached/exceeded and/or a threshold compute budget (block 310) is attained/reached/exceeded. If a threshold accuracy is attained/reached/exceeded and/or if the threshold compute budget is attained/reached/exceeded, then the computer system can return the coreset images (block 312). In some instances, if both the threshold accuracy and the threshold compute budget are exceeded, the distilled dataset can be closed. More specifically, it can be closed as a synthetic coreset that is repre-sentative of the dataset (e.g., the original or starting dataset). However, if one or both of the threshold accuracy and/or the threshold compute budget is not attained/reached/exceeded, then the computer system can iteratively perform sampling and computing portions of the algorithm again. For example, the computer system can update the coreset images to increase accuracy (e.g., increase accuracy by at least some predetermined threshold amount) (block 314). Another reason to perform the sampling and computing portions of the algorithm one or more additional times can be to inject and/or improve corruption of the coreset images to preserve privacy (block 316). This can be done even if the threshold accuracy and/or the threshold compute budget is attained/reached/exceeded, assuming that privacy preservation is desired, or needs to be further enhanced where such preservation has already been introduced as part of the algorithm. In some implementations, block 316 may optionally be performed as part of the process 300.

Once blocks 314 and/or 316 are performed, an additional batch of images and labels can be sampled from the dataset. In other words, the computer system can return to block 304 and repeat through the process 300. These newly sampled images and labels may include one or more images and labels from the dataset that were not previously sampled, but may also include one or more images and labels that were previously sampled. The trained neural network prediction can be further computed on the newly sampled images (some of the newly sampled images may have been previously sampled, in some implementations), for example using the non-deterministic feature NNGP approximation (block 306). Likewise, the accuracy of the network predictions can be computed with respect to the newly sampled dataset labels (block 308). Subsequently, a determination can be made if the designated threshold accuracy has been attained and/or if a compute budget has been exceeded (block 310). As described above, if one or both is yes, the coreset images can be returned (block 312), but if one or both is no, then additional sampling and computing can be performed (blocks 314 and/or 316).

In some implementations, a threshold accuracy and/or threshold compute budget can vary based on a variety of factors, including but not limited to a number and size of available GPUs at the computer system and/or the functions being performed. Therefore, examples provided for herein are not intended to be limiting. In some implementations, for example, a threshold accuracy can be approximately in the range of about 70% of a performance of learning an original dataset to about 100% of the performance of learning an original dataset. This can also be referred to as the threshold accuracy being about 70 percent of performance of learning an original dataset or better. This performance level can be achieved for any starting dataset, including but not limited to an original dataset, a large dataset, a sensitive dataset, or a synthetic dataset, such as a dataset generated by applying one or more kernels and/or approximations prior to the implementation referenced here. As another non-limiting example, a compute budget can be approximately in the range of about 1 GPU-hour to about 14 GPU hours.

Testing Non-Deterministic Feature Methods

FIG. 4 illustrates a table 400 of kernel distillation results from performing the disclosed RFAD algorithm and other dataset distillation algorithms. Data generated by the RFAD algorithm can generally be considered synthetic data, the synthetic data being generated from the real data inputted into the algorithm. As described herein, the synthetic data can be a representation of the existing dataset that is different from the existing dataset. The synthetic data may be generated using computer-implemented techniques and can be considered a synthetic representation of the existing dataset. In some implementations, synthetic data can be different than augmented data. Augmented data can include data derived from computer simulations and/or standard data augmentation techniques. Although the disclosed RFAD algorithm can use augmented, original, and/or synthetic data as inputs, the algorithm generates output in the form of synthetic data.

As shown in the illustrative example of the table 400, the disclosed RFAD algorithm can be applied to five datasets: the Modified National Institute of Standards and Technology (MNIST) dataset, the FashionMNIST dataset, the Street View House Numbers (SVHN) dataset, the CIFAR-10 dataset, and the CIFAR-100 dataset. The five datasets can be distilled, using the disclosed techniques, to coresets with 1, 10, or 50 images per class, although other amounts of images per coreset are possible.

For setting up a network structure and training, standard ConvNet architectures can be used with three convolutional layers, average pooling, and ReLU activations. Instancenorm layers may not be used in this illustrative example at least in part because of a lack of an infinite-width analog. During training, $N=8$ random models can be used, each with $C=256$ convolutional channels per layer, and during test-time, the datasets can be evaluated using an exact NNGP using neural-tangents library known to those skilled in the art. Both fixed and learned labels configurations can be considered, with Platt scaling applied and no data augmentation. The regularized Zero Component Analysis (ZCA) preprocessing can be used for SVHN, CIFAR-10, and CIFAR-100 datasets to improve KRR performance for color image datasets.

As a baseline, as shown in the table 400, RFAD algorithm performance can be compared to other dataset distillation algorithms, such as the KIP algorithm, Dataset Condensation with gradient matching (DC), and differentiable Siamese augmentation (DSA). The table 400 shows kernel distillation results on the five datasets with varying support set sizes. The bolded values in the table 400 indicate best performance with fixed labels, whereas underlined values indicate best performance with learned labels. NAs shown, DC and DSA use fixed labels.

Figures 5A, 5B:
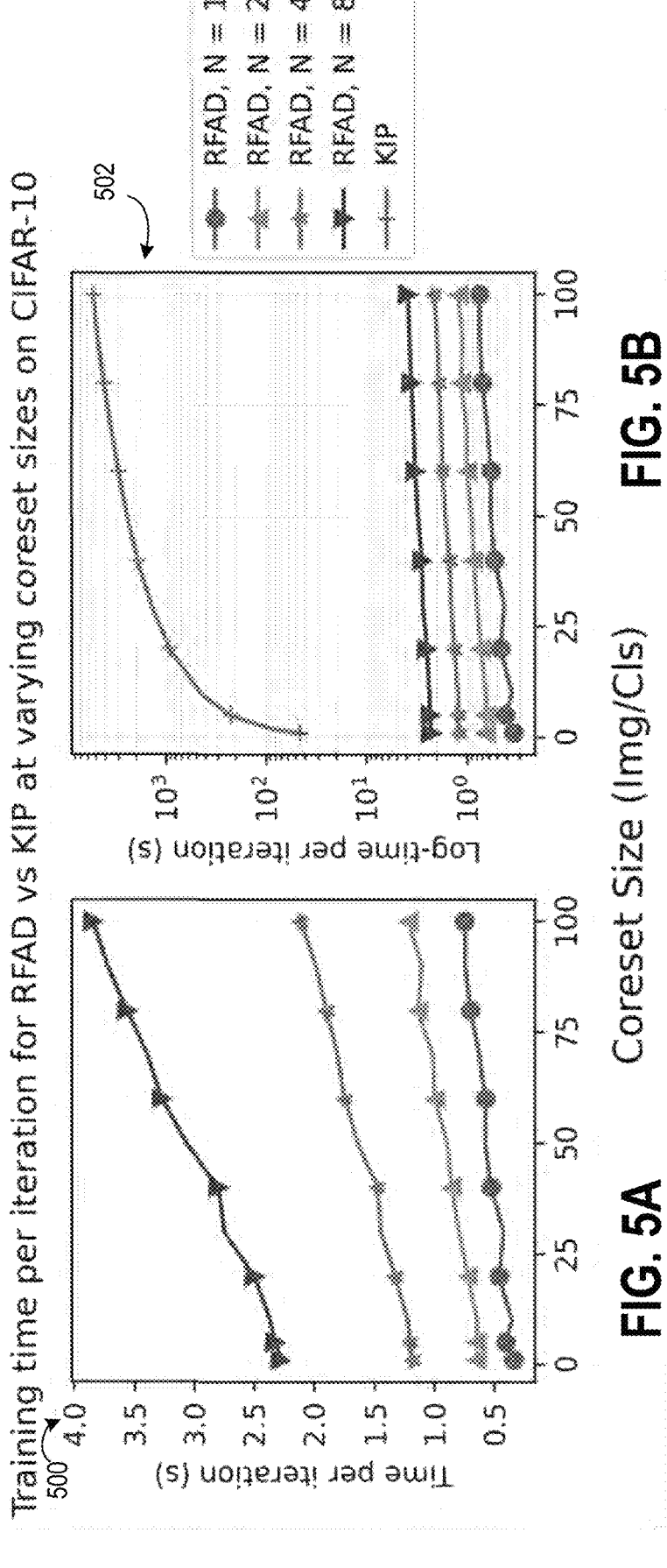
FIG. 5A illustrates a graph indicating training time per iteration for the disclosed RFAD algorithm versus the KIP algorithm at varying coreset sizes.
FIG. 5B illustrates a graph indicating log-time per iteration for the disclosed RFAD algorithm versus the KIP algorithm at varying coreset sizes.

FIGS. 5A and 5B illustrate graphs indicating training time per iteration for the disclosed RFAD algorithm versus a KIP algorithm at varying coreset sizes. In the fixed label configuration, the disclosed RFAD algorithm can outperform other models in almost every dataset. In particular, the disclosed RFAD algorithm can outperform the KIP algorithm by approximately 6.1% in the CIFAR-10 dataset 10 images per class (img/cls) setting (refer to FIG. 4). This improvement may, in some implementations, be attributed to using Platt scaling. In some implementations, the RFAD algorithm may fall slightly behind the KIP algorithm with learned labels. While this can partially be explained where data-augmentation is not applied with the RFAD algorithm, which can marginally elevate performance for the KIP algorithm on some datasets, this performance difference may additionally or alternatively be caused by increased gradient variance associated with a non-deterministic feature method of the RFAD algorithm. Nevertheless, in all illustrative experiments described herein, the RFAD algorithm can be at least two orders of magnitude faster than the KIP algorithm.

The graphs in FIGS. 5A and 5B illustrate the faster time per iteration of the RFAD algorithm in comparison to the KIP algorithm with a varying number of models, N. Graph 500, in FIG. 5A, represents a linear plot of time and graph 502, in FIG. 5B, represents a logarithmic time for training iteration. As shown by the graphs 500 and 502, the RFAD algorithm can result in over a two-order-of-magnitude speedup over the KIP algorithm per training iteration, while converging in a similar number of iterations.

Time efficiency of the RFAD algorithm can also be evaluated. FIGS. 5A and 5B show the time taken per training iteration on the CIFAR-10 dataset over coreset sizes and the number of models, N used to evaluate the empirical NNGP during training. Each training iteration can contain 5120 examples from the training set. The graphs 500 and 502 illustrate that the time taken by the RFAD algorithm can be linear in both the number of models used during training and in the coreset size, which can validate the time complexity described of the algorithm described above. For larger coreset sizes, the matrix inversion can begin to dominate due to its cubic complexity, but for small coreset sizes, computation of the kernel matrix can dominate the computation time.

The graph 502 shows similar results as the graph 500, but in log-scale, thus allowing for the timing aspect of the RFAD algorithm to be compared to the KIP algorithm. For the KIP algorithm, a batch size of 5000 can be used, and rather than measuring the time taken, a calculation can be performed to determine running time of the algorithm. Even for modest coreset sizes, quadratic time complexity of computing the exact kernel matrix in the KIP algorithm can result in the KIP algorithm being multiple orders of magnitude slower than the RFAD algorithm. Both the KIP and RFAD algorithms converge approximately in a range of about 3000 training iterations to about 15,000 training iterations, resulting in times approximately in a range of about 1 hour to about 14 hours for the RFAD algorithm and several hundred GPU hours for the KIP algorithm, depending, at least in part, on the coreset size dataset, and when an early stopping condition may be triggered.

Figures 6A, 6B, 6C, 6D, 6E:
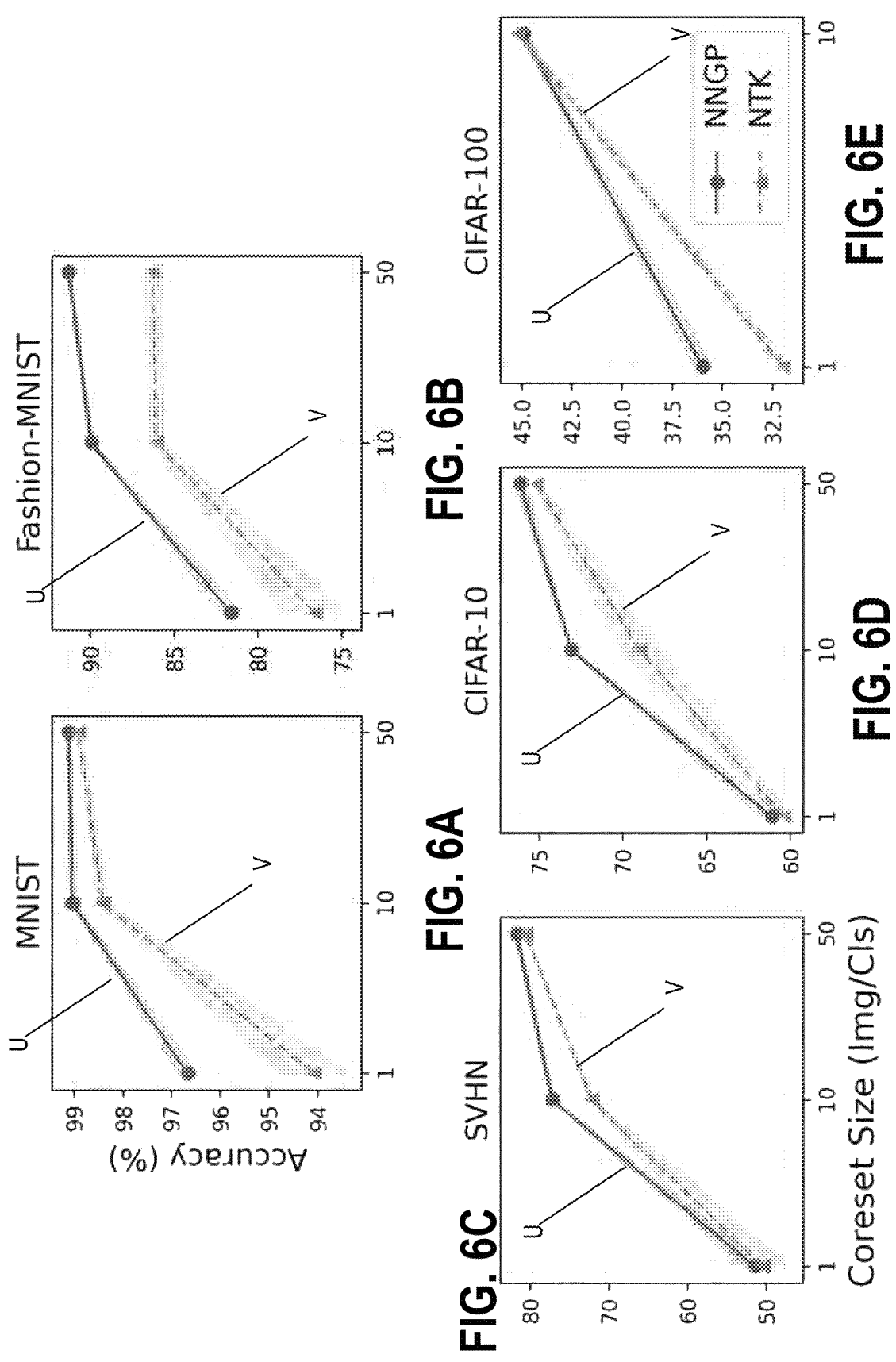
FIG. 6A illustrates a graph indicating coreset performance when evaluated using neural tangent kernel (NTK) compared to neural network Gaussian process kernel (NNGP) using the MNIST dataset.
FIG. 6B illustrates a graph indicating coreset performance when evaluated using NTK compared to NNGP using the Fashion-MNIST dataset.
FIG. 6C illustrates a graph indicating coreset performance when evaluated using NTK compared to NNGP using the SVHN dataset.
FIG. 6D illustrates a graph indicating coreset performance when evaluated using NTK compared to NNGP using the CIFAR-10 dataset.
FIG. 6E illustrates a graph indicating coreset performance when evaluated using NTK compared to NNGP using the CIFAR-100 dataset.

FIGS. 6A-6E illustrate graphs indicating coresets performance when evaluated using NTK compared to NNGP, with each graph being directed to a different dataset: FIG. 6A the MNIST dataset; FIG. 6B the Fashion-MNIST dataset; FIG. 6C the SVHN dataset; FIG. 6D the CIFAR-10 dataset; and FIG. 6E the CIFAR-100 dataset. As described herein, the RFAD algorithm replaces the NTK with an empirical NNGP. The distilled coresets obtained from the RFAD algorithm in two different transfer scenarios are evaluated in FIGS. 6A-6E. In the first setting, at test time, an NTK can be used instead of the NNGP. In the second setting, a finite-width network with gradient descent on the distilled datasets obtained via RFAD can be trained. A 1024-width finite network for the finite-transfer results can be used at least because it can mimic an infinite width setting that can correspond to the NTK.

As illustrated in FIGS. 6A-6E, in most datasets, these coresets experience little to no performance drop when evaluated using the NTK compared to the exact NNGP, despite being trained using the empirical NNGP. The largest performance gap is about 8% on the SVHN dataset with 10 images per class (see FIG. 6C), and in some datasets, notably the CIFAR-100 dataset, 10 img/cls evaluating using the NTK outperforms the NNGP (see FIG. 6E). Therefore, either the exact NNGP or the non-deterministic feature NNGP can be used as a less expensive and more efficient approximation for the exact NTK.

FIG. 7 illustrates a table 701 of resulting finite network transfer when training with gradient descent on coresets. Images appear to have the best performance in finite-network transfer, outperforming the KIP algorithm in almost all benchmarks and the DC/DSA algorithms in many, despite DC/DCA being designed specifically for finite-width networks. This performance gain over the KIP algorithm can be attributed, at least in part, to two actions used during training. Firstly, centering can be applied, which, rather than training a typical network $f_\theta(x)$, a network can be trained with its output at initialization subtracted: $f_\theta(x)-f_{\theta_0}(x)$. This can speed up convergence of finite-width networks by reducing the bias caused by the finite-width initialization while still preserving the NTK. At least for small datasets, this modification significantly can improve performance. The second action taken to achieve the performance gain over the KIP algorithm can be label scaling. More particularly, the target labels can be scaled, for example by a factor $$\alpha > 1 : L_\alpha = \|f_\theta(x) - \alpha y\|_2^2 / \alpha^2,$$

and at inference the outputs of the model can be divided by a. This action may not affect the infinite-width setting, as in KRR, and the output can be linear with respect to the support set labels. In the table 701, "*" denotes a result that was obtained using learned labels.

Figures 8A, 8B, 8C:
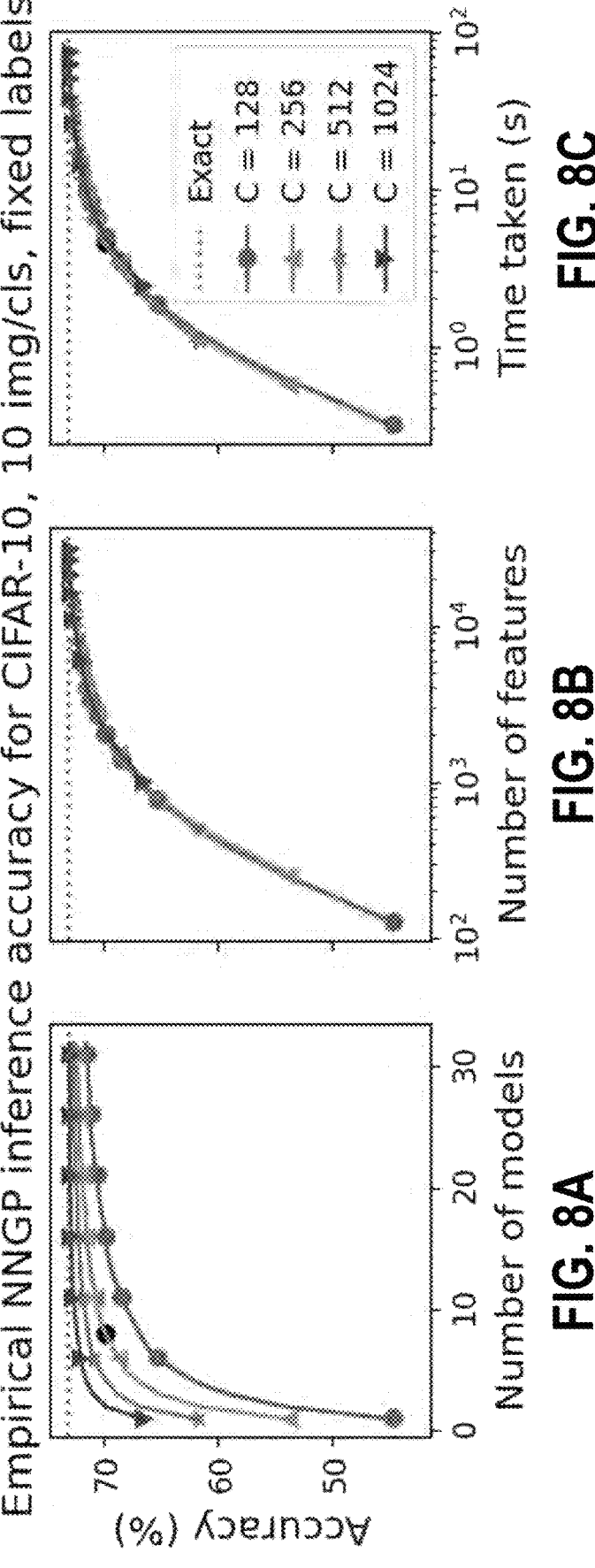
FIG. 8A illustrates a graph indicating classification accuracy across a number of models on a dataset using the disclosed RFAD algorithm.
FIG. 8B illustrates a graph indicating classification accuracy across a number of features on a dataset using the disclosed RFAD algorithm.
FIG. 8C illustrates a graph indicating classification accuracy across time taken on a dataset using the disclosed RFAD algorithm.

FIGS. 8A-8C illustrate graphs indicating classification accuracy on a dataset using the disclosed RFAD algorithm, with FIG. 8A providing accuracy in view of the number of models used, FIG. 8B providing accuracy in view of the number of features used, and FIG. 8C providing accuracy in view of the time taken in seconds. Accordingly, the graphs show empirical NNGP performance at test-time with varying number of models used to compute the empirical NNGP and number of convolutional channels per model. In an illustrative example, to validate efficacy of the disclosed RFAD algorithm, the distilled coresets can be evaluated using one or more features from non-deterministic networks as opposed to an exact kernel. A width of individual networks can be varied approximately in a range of about 128 channels to about 1024 channels and a number of models approximately in a range of about 1 model to about 32 models. As shown, the tested channels included 128 channels (labeled G in the graphs), 256 channels (labeled H in the graphs), 512 channels (labeled I in the graphs), and 1024 channels (labeled J in the graphs). FIGS. 8A-8C show resulting classification accuracy on the CIFAR-10 dataset with 10 images/class. The black dot in each graph represents the configuration used during training: 8 models, each with width 256. The non-deterministic feature method, for all network widths, can reach close to the exact NNGP performance (dotted line, labeled F in the graphs) if a sufficient number of models are used. The performance may also be almost entirely dependent on the total number of features (proportional to C×N, with C being the number of convolutional channels) and not the width of individual networks, suggesting that the finite-width bias associated with non-deterministic finite networks is minimal. In some implementations, approximately 70% accuracy can be achieved with a network with a single convolutional channel.

Figures 9A, 9B:
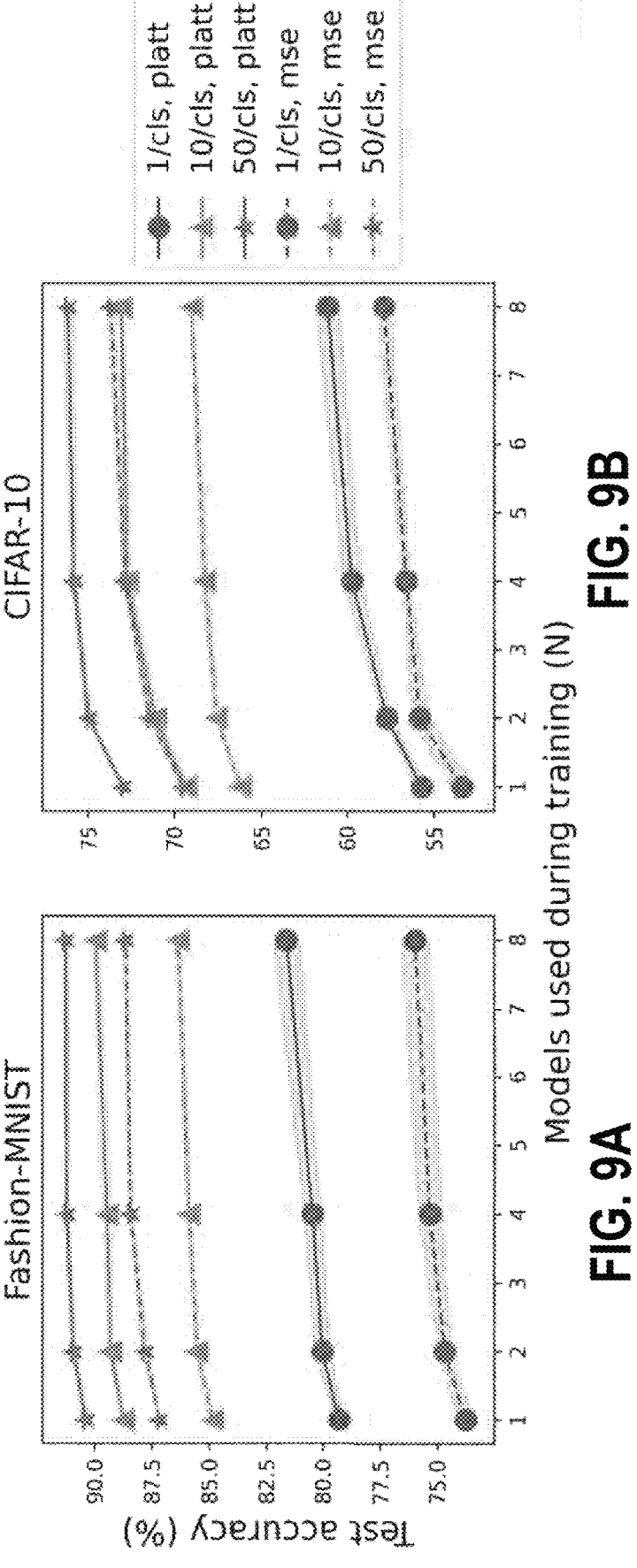
FIG. 9A illustrates a graph indicating resulting performance from using Platt-scaling with the disclosed RFAD algorithm with the Fashion-MNIST dataset.
FIG. 9B illustrates a graph indicating resulting performance from using Platt-scaling with the disclosed RFAD algorithm with the CIFAR-10 dataset.

FIGS. 9A and 9B illustrate graphs indicating resulting performance from using Platt-scaling with the disclosed RFAD algorithm. Sensitivity of test accuracy of the RFAD algorithm to the use of Platt scaling or MSE loss and number of models used to compute the empirical NNGP during training are shown. Using Platt-scaling can result in significant performance gains, while the disclosed RFAD algorithm is robust to low-model count. More particularly, the resulting performance is illustrated for 1/cls using Platt-scaling (labeled K in the graphs), 10/cls using Platt-scaling (labeled L in the graphs), 50/cls using Platt-scaling (labeled M in the graphs), 1/cls using MSE loss (labeled N in the graphs), 10/cls using MSE loss (labeled O in the graphs), and 50/cls using MSE loss (labeled P in the graphs), both using the Fashion-MNIST dataset, as shown in FIG. 9A, and the CIFAR-10 dataset, as shown in FIG. 9B.

Ablations on use of cross-entropy loss and number of models used during training can be performed, in at least some implementations. The disclosed RFAD algorithm can be reran on the CIFAR-10 dataset and the Fashion-MNIST dataset, using 1, 2, 4, and/or 8 models (or any other predetermined quantity of models) during training, using MSE loss, cross-entropy loss, and/or another predetermined type of loss. As shown in the graphs of FIG. 9, using a cross-entropy loss can result in substantial performance gains, even as much as about 8% as with the Fashion-MNIST dataset with 1 img/cls.

Applications and Uses of Non-Deterministic Feature Methods

Figure 10:
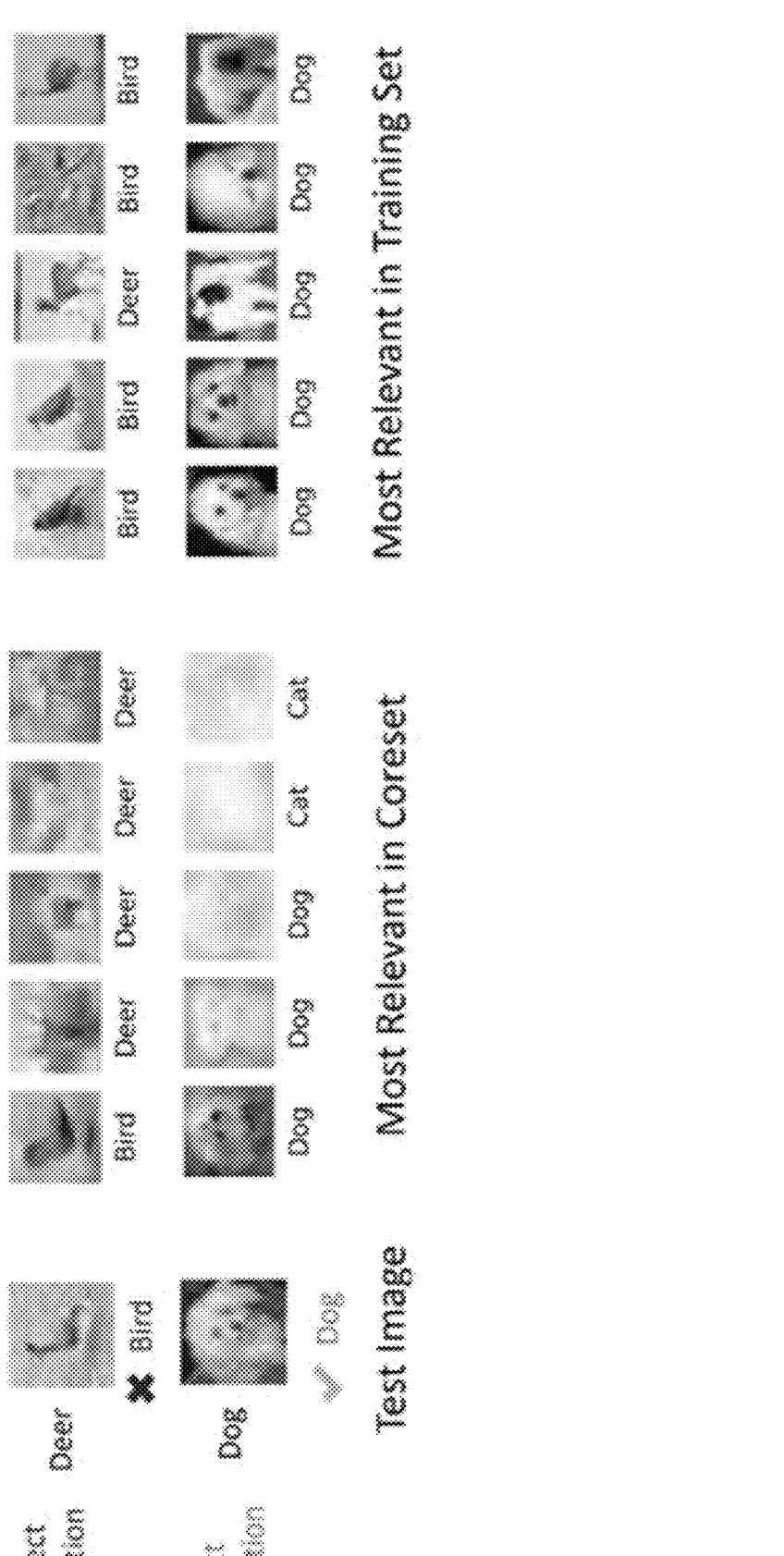
FIG. 10 illustrates example results from using the disclosed RFAD algorithm with test image data.

FIG. 10 illustrates example results from using the disclosed algorithm with test image data. FIG. 10 is a non-limiting example of how the disclosed techniques can be applied to different use cases. Large datasets can contribute to difficulty of understanding deep learning models. One non-limiting application of the RFAD algorithm can be used in conjunction with interpretability in the sense of influence of individual training examples on network predictions. One method of understanding this effect can be the use of influence functions, which can seek to answer the following counterfactual question: which item in the training set, if left out, would change the prediction of the model the most? For deep networks, this can be answered approximately because retraining a network on copies of the training set with individual items left out can be computationally intractable. One solution can be to use kernel ridge regression on a small support set. The KRR on the kernel matrices can be recomputed with the ith individual coreset element removed, with $K_{x,S\backslash i} K_{S\backslash i,S\backslash i}$ being the resulting kernel matrices with the ith row/column corresponding to the ith coreset entry removed.

In particular, let $p(y_{test}=c|S)$ be the probability prediction (computed by applying Platt scaling described above) of an example belonging to class c computed on an entire coreset, S. Let $p(y_{test}=c|S)\backslash i$ be the same prediction calculated with the ith coreset element removed. The influence score, $I_i$ of coreset element i on $x_{test}$ can be defined as $\Sigma_{c\leq C}|p(y_{test}=c|S)-p(y_{test}=c|S\backslash i)|$. Taking the top values of $I_i$ can yield relevant examples.

While this method can provide a simple way of gaining insights into how a prediction depends on the coreset, it does not provide insight into how this prediction comes from the original training set that produced the coreset. The method can be extended to accommodate this. Heuristically, it can be conjectured that two elements may be similar if their predictions depend on the same elements in the coreset. For every element j in the training set and i in the coreset, it can be computed that $p(y_j=c|S)$ and $p(y_j=c|S\backslash i)$. Then, its influence embedding can be defined as $$z_{i,c}^j = p(y_j = c \mid S) - p(y_j = c \mid S\backslash i), z^j \in R^{|S|\times|C|}.$$

This way, $z^j$ can define the sensitivity of a training datapoint prediction on the coreset. The same embedding can be computed for a test datapoint $z^{test}$, and to compare data points, compute a cosine similarity, $J_{test,j}=\cos(z^{test}, z^j)$. Values of $z^j$ can be precomputed for the training set, typically in a few minutes for the CIFAR-10 dataset, which can allow for relatively fast queries, in contrast to more expensive Hessian-inverse vector product that may be used in previous methods, which can also be costly to compute and challenging to store.

FIG. 10 shows results of the RFAD algorithm applied to the CIFAR-10 dataset with 50 img/cls for an incorrectly and correctly predicted image. In both cases, the resulting queries are visually similar to the test data point. A practitioner can use this information to explain a single incorrect prediction and to understand harmful items in their test set or where more data may need to be collected. The most relevant images for an incorrect (top row) and correct (bottom row) prediction on the CIFAR-10 dataset are shown in FIG. 10. The most relevant coreset images can be picked based on the coreset influence score I, and for their training set, the training influence score J. These metrics can be fast to compute and result in semantically meaningful explanations for these two predictions.

Figures 11A, 11B:
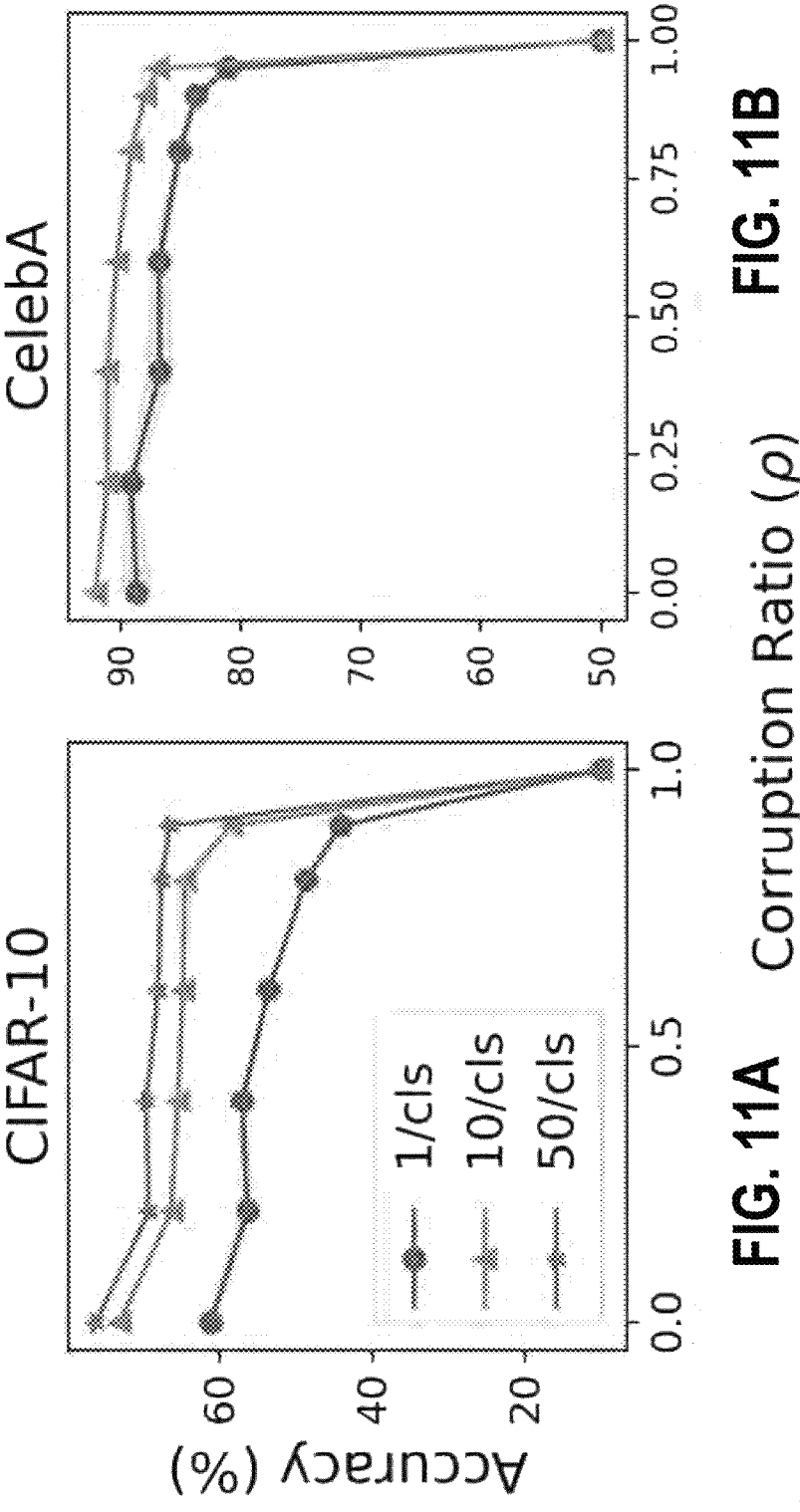
FIG. 11A illustrates a graph indicating results from using the disclosed RFAD algorithm in a data privacy context with the CIFAR-10 dataset.
FIG. 11B illustrates a graph indicating results from using the disclosed RFAD algorithm in a data privacy context with the CelebA dataset.

FIGS. 11A and 11B illustrate graphs indicating results from using the disclosed algorithm in a data privacy context. A second non-limiting application of the RFAD algorithm can include creation of coresets that contain no human-understandable information from a source dataset yet still retain high test performance. The concept of a $\rho$-corrupted coreset can include the following: a fraction $\rho$ of the coresets elements that may be completely independent of the source dataset. Practically, for the RFAD algorithm, this means initializing the coreset with random noise and keeping a non-deterministic $\rho$ fraction of the pixels kept at their initialization. This algorithm can be referred to as $READ_\rho$ or the $RFAD_\rho$ algorithm. Adding noise to gradient updates of the inputs of a network can be shown to give differentially private guarantees. While the present scheme may not provide the same or similar guarantees, the following two privacy-preserving properties of RFAD, may be relevant. Firstly, the distillation process may be irreversible. There are many datasets for which a distilled dataset can provide zero loss. Secondly, if the true data distribution assigns a low probability to images of white noise, then for high values of $\rho$, this may guarantee that the distilled dataset stays away in $L_2$ norm from real data points, at least because $\rho$ fraction of the pixels may be stuck at their initialization. This means that a distilled $RFAD_\rho$ dataset may not recreate any real points in the training set.

In one non-limiting example, the $RFAD_\rho$ algorithm can be applied on the CIFAR-10 dataset and the CelebA faces dataset. For the CIFAR-10 dataset, as shown in FIG. 11A, the standard 10-class classification task can be distilled with corruption ratios taking values of [0, 0.2, 0.4, 0.8, 0.9], with 1 img/cls (labeled Q in the graphs), 10 img/cls (labeled R in the graphs), or 50 img/cls (labeled S in the graphs). For the CelebA dataset, as shown in FIG. 11B, male/female binary classification can be performed with corruption ratios between 0 and about 0.95 with 1 image or sample per class, 10 images or samples per class, or 50 images or samples per class. FIG. 11A shows the resulting performance of the RFAD algorithm on the CIFAR-10 and FIG. 11B shows the resulting performance of the RFAD algorithm on the CelebA dataset classification with varying support set sizes and corruption ratios. Performance, at least in some implementations, may degrade gradually as noise may be increased, still achieving high performance with approximately 90% corruption. For the CIFAR-10 dataset, even at corruption ratios of about 0.9, an approximately 40.6% accuracy can be achieved with one sample per class, which can be above a natural baseline of approximately 16.1% or another predetermined baseline. For the CelebA dataset, approximately 81% accuracy can be achieved with a total of two images, one male and one female, in the dataset, with approximately 95% of the pixels in the image being random noise.

Figure 12:
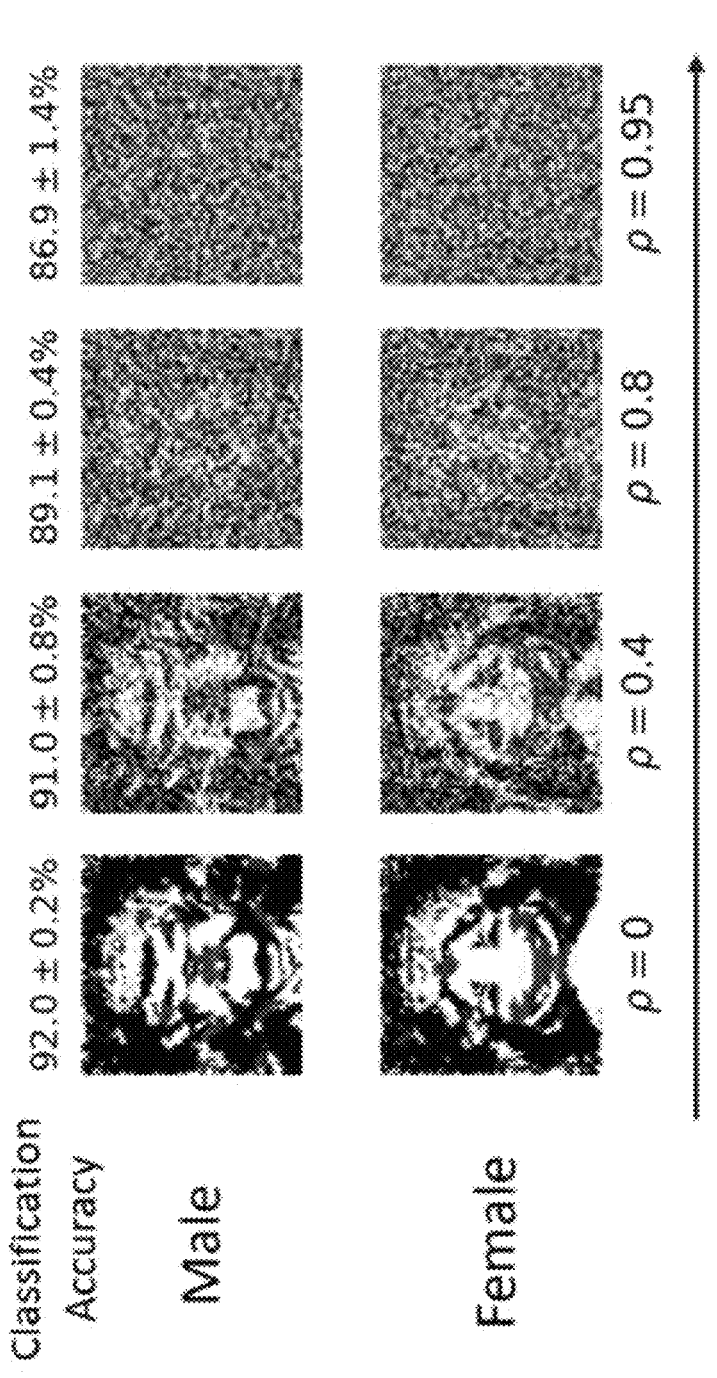
FIG. 12 illustrates example classification accuracy of image data using the disclosed RFAD algorithm.

FIG. 12 illustrates example classification accuracy of image data using the disclosed RFAD algorithm. The CelebA distilled datasets for male/female classification with 1 image per class at varying corruption ratios are shown in FIG. 12. At $\rho=0$, the distilled images can be very interpretable, but at $\rho=0.95$, the images may look like white noise, despite achieving approximately 86.9% accuracy on a classification task. The distilled images for the male and female classes in the CelebA distillation task with one image per class shown in FIG. 11 can also be visualized in FIG. 12 at varying corruption ratios. While the image may initially contain visually interpretable features with $\rho=0$, those features may quickly devolve into pure noise at $\rho=0.95$.

More generally, the disclosed RFAD algorithm can be used to transform original datasets into a private version of such datasets. This enables a user to privately share his or her sensitive data with third party software platform companies and other third parties while also maintaining performance and privacy of one or more downstream tasks.

As another non-limiting example, the disclosed RFAD algorithm can be used for onboard updates on self-driving vehicles as an active learning platform. The present disclosure is data agnostic and can operate on a wide range of data modalities, such as pixel inputs, time series, sensor readouts, natural language, and/or tabular data, among others.

In some implementations, datasets distilled without instancenorm may not transfer well to finite networks with instancenorm. Conversely, if non-deterministic networks are used with instancenorm in RFAD, these may transfer to finite networks with instancenorm, but may not transfer to ones without the NNGP. This suggests that the features used by networks with/without instancenorm differ, which can make it challenging to distill datasets that perform well on both.

In some implementations, overfitting may also occur. In simple datasets, such as the MNIST dataset, or with large coresets relative to the data, such as the CIFAR-100 dataset with 10 images per class, the dataset can be overfit. These distilled datasets can achieve near 100% classification accuracy on the training set, meaning that it can be distilled perfectly in terms of Platt-loss. This implies that adding more images may not improve performance, in at least some implementations. Therefore, it may not be advantageous to use Platt-loss, for example if a compression ratio is low (e.g., below a predetermined threshold ratio, level, value, or range).

FIG. 13 is a flowchart of another process 1300 for generating a synthetic dataset from an original dataset using the disclosed algorithm. The process 1300 can be performed by the computer system 102 or any other computing system described herein. In some implementations, the process 1300 can be advantageously performed on a single graphics processing unit (GPU). For illustrative purposes, the process 1300 is described from the perspective of a computer system.

Referring to the process 1300, the computer system can sample a batch of data from a dataset to form a coreset in block 1302. As an illustrative example, the dataset can include a large dataset exceeding approximately $10^4$ samples, with each sample being of a dimensionality of approximately $10^3$ or larger.

In block 1304, the computer system can apply a non-deterministic feature neural network training kernel approximation to at least some portion of the coreset. This, in turn, can define a modified coreset. As described throughout this disclosure, the neural network training kernel can be an NTK, an NNGP, and/or one or more other learned kernels. Applying a non-deterministic feature neural network training kernel approximation to at least some portion of the coreset further can include using a kernel matrix computation that can be O(|S|). In some implementations, a speed of performing the process 1300 can be at least 100-fold faster than compared to performing the method by applying an NTK instead of the non-deterministic feature neural network training kernel to the at least some portion of the coreset. An amount of time for performing the process 1300, sometimes referred to as a speed, can be approximately in the range of about 1 hour to about 14 hours.

Optionally, the computer system can apply Platt-scaling to the at least some portion of the coreset to which the non-deterministic feature neural network training kernel approximation is applied in block 1306. Applying the Platt-scaling can include applying a cross entropy loss to the at least some portion of the coreset to which the non-deterministic feature neural network training kernel approximation is applied.

Additionally, or alternatively, the computer system can optionally compute trained neural network predictions on the at least some portion of the coreset in block 1308. Further, additionally, or alternatively, the computer system can optionally compute an accuracy of the trained neural network predictions in block 1310. Additionally, or alternatively, the computer system can optionally perform a comparison of: (i) the computed accuracy to a threshold accuracy and/or (ii) a compute budget for applying the approximation to a threshold compute budget in block 1312. As an illustrative example, the accuracy threshold can be approximately in the range of about 70 percent of performance of learning an original dataset or better. The compute budget can be approximately 14 GPU hours or less.

Additionally, or alternatively, the computer system can optionally determine whether the comparison in block 1312 exceeds the respective threshold accuracy and/or compute budget (or satisfies one or more criteria and/or threshold levels or ranges) in block 1314. The computer system may determine whether both the threshold accuracy and compute budget are exceeded. In some implementations, the computer system may determine whether only one of the threshold accuracy and compute budget is exceeded.

If the computer system determines that the threshold accuracy and/or compute budget is exceeded, then the computer system can proceed to block 1316, in which the computer system generates and returns a distilled, synthetic dataset from the coreset to which the non-deterministic feature neural network training kernel can be applied. The distilled synthetic dataset can include data that is synthetic and representative of the dataset. The distilled synthetic data can include privacy-protected data. If the computer system determines that the threshold accuracy and/or the compute budget is not exceeded, then the computer system can return to block 1304 and iterate through the process 1300.

Computer Implementation of Non-Deterministic Feature Methods

Figure 14:
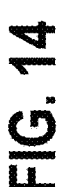
FIG. 14 a block diagram of an exemplary embodiment of a computer system for performing the disclosed techniques.

FIG. 14 a block diagram of an exemplary embodiment of a computer system for performing the disclosed techniques and/or on which the present disclosures can be built, performed, operated, trained, etc. For example, any of the processes provided for herein can be implemented by way of the computer system 700. The operation of the systems and methods disclosed herein, including but not limited to operation of the RFAD algorithms, as well as variations of the same and other algorithms provided for herein, can be performed by at least one processor and/or controller. More specifically, implementation of the present disclosures on a computer readable medium can include a central processing unit (CPU), memory, and/or support circuits (or I/O), among other features. In embodiments having a memory, that memory can be connected to the CPU, and may be one or more of a readily available memory, such as a read-only memory (ROM), a random access memory (RAM), floppy disk, hard disk, cloud-based storage, or any other form of digital storage, local or remote. Software instructions, algorithms (e.g., the process(es) for distilling a dataset to a coreset), and data can be coded and stored within the memory for instructing the CPU. Support circuits can also be connected to the CPU for supporting the processor in a conventional manner. The support circuits may include conventional cache, power supplies, clock circuits, input/output circuitry, and/or subsystems, and the like.

The system 700 can include a processor 710, a memory 720, a storage device 730, and an input/output device 740. Each of the components 710, 720, 730, and 740 can be interconnected, for example, using a system bus 750. The processor 710 can be capable of processing instructions for execution within the system 700. The processor 710 can be a single-threaded processor, a multi-threaded processor, or similar device. The processor 710 can be capable of processing instructions stored in the memory 720 or on the storage device 730. The processor 710 may execute one or more of the operations described herein.

The memory 720 can store information within the system 700. In some implementations, the memory 720 can be a computer-readable medium. The memory 720 can, for example, be a volatile memory unit or a non-volatile memory unit. In some implementations, the memory 720 can store information related to various information and/or images that are being compared, distilled, or otherwise, among other information.

The storage device 730 can be capable of providing mass storage for the system 700. In some implementations, the storage device 730 can be a non-transitory computer-readable medium. The storage device 730 can include, for example, a hard disk device, an optical disk device, a solid-date drive, a flash drive, magnetic tape, and/or some other large capacity storage device. The storage device 730 may alternatively be a cloud storage device, e.g., a logical storage device including multiple physical storage devices distributed on a network and accessed using a network. In some implementations, the information stored on the memory 720 can also or instead be stored on the storage device 730.

The input/output device 740 can provide input/output operations for the system 700. In some implementations, the input/output device 740 can include one or more of network interface devices (e.g., an Ethernet card), a serial communication device (e.g., an RS-232 10 port), and/or a wireless interface device (e.g., a short-range wireless communication device, an 802.7 card, a 3G wireless modem, a 4G wireless modem, a 5G wireless modem). In some implementations, the input/output device 740 can include driver devices configured to receive input data and send output data to other input/output devices, e.g., a keyboard, a printer, and/or display devices. In some implementations, mobile computing devices, mobile communication devices, and other devices can be used.

In some implementations, the system 700 can be a microcontroller. A microcontroller is a device that contains multiple elements of a computer system in a single electronics package. For example, the single electronics package could contain the processor 710, the memory 720, the storage device 730, and/or input/output devices 740.

Abbreviated Summary and Examples of Non-Deterministic Feature Methods

The RFAD algorithm described herein can be a dataset distillation algorithm that provides a 100-fold speedup over existing algorithms such as the KIP algorithm, while retaining accuracy. The speedup can be due, at least in part, to use of an approximate NNGP as opposed to an exact NTK, thereby reducing a time complexity from $O(|S|^2)$ to $O(|S|)$. The success of the approximation provided for herein, combined with similarity between the NTK and NNGP described above, may suggest the non-deterministic network NNGP approximation as an efficient method for algorithms where the exact computation of the NNGP or NTK is infeasible. With the disclosed techniques, the NTK can likely be used as an algorithmic design tool in addition to its current theoretical use for neural network analysis.

Examples of the above-described embodiments can include the following:

1. A method for performing dataset distillation:
    sampling a batch of data from a dataset to form a coreset;
    applying a non-deterministic feature neural network training kernel approximation to at least some portion of the coreset to define a modified coreset; and
    generating a distilled dataset from the modified coreset, the distilled dataset comprising data that is synthetic and representative of the dataset.

2. The method of example 1, wherein the dataset comprises a large dataset exceeding approximately $10^4$ samples, with each sample being of dimensionality of approximately $10^3$ or larger.

3. The method of examples 1 or 2, further comprising:
    applying Platt-scaling to the modified coreset to define a Platt-scaled coreset,
    wherein generating the distilled dataset from the modified coreset further comprises generating the distilled dataset from the Platt-scaled coreset.

4. The method of example 3,
    wherein applying Platt-scaling to the modified coreset further comprises applying a cross entropy loss to the Platt-scaled coreset, and
    wherein generating the distilled dataset from the modified coreset further comprises generating the distilled dataset from the cross entropy loss applied Platt-scaled coreset.

5. The method of any of examples 1 to 4,
    wherein the dataset comprises a plurality of images, the images having labels associated therewith, and
    wherein sampling a batch of data from a dataset comprises sampling a batch of images and labels from the dataset to form the coreset,
    the method further comprising computing trained neural network predictions on the sampled batch of images.

6. The method of example 5, further comprising:
    after computing trained neural network predictions on the sampled batch of images, computing an accuracy of the trained network predictions on the sampled batch of images with respect to the labels associated with the respective images of the sampled batch of images; and
    comparing at least one of:
        the accuracy of the trained network predictions on the sampled batch of images to a threshold accuracy; or
        a compute budget used to perform the action of applying a non-deterministic feature neural network training kernel approximation to a threshold compute budget,
    wherein if at least one of the threshold accuracy or the threshold compute budget is not exceeded, performing the action of applying a non-deterministic feature neural network training kernel approximation to at least some portion of the coreset again, or
    wherein if both the threshold accuracy and the threshold compute budget is exceeded, closing the distilled dataset.

7. The method of example 6,
    wherein the dataset is an original dataset, and
    wherein the threshold accuracy is about 70 percent of performance of learning the original dataset or better.

8. The method of examples 6 or 7, wherein a compute budget is approximately 14 GPU hours or less.

9. The method of any of examples 1 to 8, wherein applying a non-deterministic feature neural network training kernel approximation to at least some portion of the coreset to define a modified coreset further comprises using a kernel matrix computation that is $O(|S|)$.

10. The method of any of examples 1 to 9, wherein the method is performed on a single graphics processing unit.

11. The method of any of examples 1 to 10, wherein a speed of performing the method is at least 100-fold faster than compared to performing the method by applying a neural tangent kernel (NTK) instead of the non-deterministic feature neural network training kernel to the at least some portion of the coreset.

12. The method of any of examples 1 to 11, wherein an amount of time for performing the method is approximately in the range of about 1 hour to about 14 hours.

13. The method of any of examples 1 to 12, wherein the non-deterministic feature neural network training kernel is at least one of a neural network Gaussian process (NNGP) kernel, a neural tangent kernel (NTK), or other learned training kernels.

14. The method of example 13, wherein the non-deterministic feature neural network training kernel is the NNGP.

15. The method of any of examples 1 to 14, wherein the distilled dataset is privacy-protected data.

16. The method of any of examples 1 to 15, wherein the distilled dataset is minimized in size with respect to the dataset.

17. A system for performing dataset distillation, comprising:
a processor configured to perform a process comprising:
sampling a batch of data from a dataset to form a coreset;
applying a non-deterministic feature neural network training kernel approximation to at least some portion of the coreset to define a modified coreset; and
generating a distilled dataset from the modified coreset, the distilled dataset comprising data that is synthetic and representative of the dataset.

18. The system of example 17, wherein the non-deterministic feature neural network training kernel is at least one of a neural network Gaussian process (NNGP) kernel, a neural tangent kernel (NTK), or other learned training kernels.

19. The system of example 18, wherein the non-deterministic feature neural network training kernel is the NNGP.

20. The system of any of examples 17 to 19,
wherein the dataset comprises a plurality of images, the images having labels associated therewith, and
wherein sampling a batch of data from a dataset comprises sampling a batch of images and labels from the dataset to form the coreset,
the process the processor is configured to perform further comprises computing trained neural network predictions on the sampled batch of images.

21. The system of any of examples 17 to 20, wherein the process that the processor is configured to perform further comprises:
after computing trained neural network predictions on the sampled batch of images, computing an accuracy of the trained network predictions on the sampled batch of images with respect to the labels associated with the respective images of the sampled batch of images; and
comparing at least one of:
the accuracy of the trained network predictions on the sampled batch of images to a threshold accuracy; or
a compute budget used to perform the action of applying a non-deterministic feature neural network training kernel approximation to a threshold compute budget,
wherein if at least one of the threshold accuracy or the threshold compute budget is not exceeded, performing the action of applying a non-deterministic feature neural network training kernel approximation to at least some portion of the coreset again, or
wherein if both the threshold accuracy and the threshold compute budget is exceeded, closing the distilled dataset.

22. A computer program, or a computer readable medium, for performing dataset distillation and that configures a computer to perform a process comprising:
sampling a batch of data from a dataset to form a coreset;
applying a non-deterministic feature neural network training kernel approximation to at least some portion of the coreset to define a modified coreset; and
generating a distilled dataset from the modified coreset, the distilled dataset comprising data that is synthetic and representative of the dataset.

23. A method for performing dataset distillation for preserving data privacy:
sampling a batch of data from a dataset to form a coreset;
applying a non-deterministic feature neural network training kernel approximation to at least some portion of the coreset to define a modified coreset;
generating a distilled dataset from the modified coreset, the distilled dataset comprising data that is synthetic and representative of the dataset; and
returning the distilled dataset for preserving data privacy during run-time use in cloud infrastructures and local software as a service (SaaS) applications.

24. The method of example 23, further comprising returning the distilled dataset for use in data privacy-preserving machine-learning-model training.

25. The method of example 23 or 24, wherein the non-deterministic feature neural network training kernel is at least one of a neural network Gaussian process (NNGP) kernel, a neural tangent kernel (NTK), or other learned training kernels.

26. The method of example 25, wherein the non-deterministic feature neural network training kernel is the NNGP.

One skilled in the art will appreciate further features and advantages of the present disclosure. Accordingly, the present disclosure is not to be limited by what has been particularly shown and described. All publications and references cited herein are expressly incorporated by reference in their entirety.

Some non-limiting claims are provided below.

What is claimed is:

1. A method for performing dataset distillation:
sampling a batch of data from a dataset to form a coreset;
applying a non-deterministic feature neural network training kernel approximation to at least some portion of the coreset to define a modified coreset; and
generating a distilled dataset from the modified coreset to preserve privacy of the modified coreset, the distilled dataset comprising data that is synthetic and representative of the dataset
wherein the non-deterministic feature neural network training kernel is at least one of a neural network Gaussian process (NNGP) kernel, a neural tangent kernel (NTK), or other learned training kernels.

2. The method of claim 1, wherein the dataset comprises a large dataset exceeding approximately $10^4$ samples, with each sample being of dimensionality of approximately $10^3$ or larger.

3. The method of claim 1, further comprising:
applying Platt-scaling to the modified coreset to define a Platt-scaled coreset,
wherein generating the distilled dataset from the modified coreset further comprises generating the distilled dataset from the Platt-scaled coreset.

4. The method of claim 3, wherein applying Platt-scaling to the modified coreset further comprises applying a cross entropy loss to the Platt-scaled coreset, and wherein generating the distilled dataset from the modified coreset further comprises generating the distilled dataset from the cross entropy loss applied Platt-scaled coreset.

5. The method of claim 1, wherein the dataset comprises a plurality of images, the images having labels associated therewith, and wherein sampling a batch of data from a dataset comprises sampling a batch of images and labels from the dataset to form the coreset, the method further comprising computing trained neural network predictions on the sampled batch of images.

6. The method of claim 5, further comprising:

after computing trained neural network predictions on the sampled batch of images, computing an accuracy of the trained network predictions on the sampled batch of images with respect to the labels associated with the respective images of the sampled batch of images; and comparing at least one of:

the accuracy of the trained network predictions on the sampled batch of images to a threshold accuracy; or a compute budget used to perform the action of applying a non-deterministic feature neural network training kernel approximation to a threshold compute budget, wherein if at least one of the threshold accuracy or the threshold compute budget is not exceeded, performing the action of applying a non-deterministic feature neural network training kernel approximation to at least some portion of the coreset again, or wherein if both the threshold accuracy and the threshold compute budget is exceeded, closing the distilled dataset.

7. The method of claim 6, wherein the dataset is an original dataset, and wherein the threshold accuracy is about 70 percent of performance of learning the original dataset or better.

8. The method of claim 6, wherein a compute budget is approximately 14 GPU hours or less.

9. The method of claim 1, wherein an amount of time for performing the method is approximately in the range of about 1 hour to about 14 hours.

10. The method of claim 1, wherein the distilled dataset is minimized in size with respect to the dataset.

11. The method of claim 1, wherein the non-deterministic feature neural network training kernel is the NNGP.

12. The method of claim 1, wherein the distilled dataset is privacy-protected data.

13. A system for performing dataset distillation, comprising:

a processor configured to perform a process comprising:

sampling a batch of data from a dataset to form a coreset;

applying a non-deterministic feature neural network training kernel approximation to at least some portion of the coreset to define a modified coreset; and generating a distilled dataset from the modified coreset to preserve privacy of the modified coreset, the distilled dataset comprising data that is synthetic and representative of the dataset, wherein the non-deterministic feature neural network training kernel is at least one of a neural network Gaussian process (NNGP) kernel, a neural tangent kernel (NTK), or other learned training kernels.

14. The system of claim 13, wherein the dataset comprises a plurality of images, the images having labels associated therewith, and wherein sampling a batch of data from a dataset comprises sampling a batch of images and labels from the dataset to form the coreset, the process the processor is configured to perform further comprises computing trained neural network predictions on the sampled batch of images.

15. The system of claim 13, wherein the process that the processor is configured to perform further comprises:

after computing trained neural network predictions on the sampled batch of images, computing an accuracy of the trained network predictions on the sampled batch of images with respect to the labels associated with the respective images of the sampled batch of images; and comparing at least one of:

the accuracy of the trained network predictions on the sampled batch of images to a threshold accuracy; or a compute budget used to perform the action of applying a non-deterministic feature neural network training kernel approximation to a threshold compute budget, wherein if at least one of the threshold accuracy or the threshold compute budget is not exceeded, performing the action of applying a non-deterministic feature neural network training kernel approximation to at least some portion of the coreset again, or wherein if both the threshold accuracy and the threshold compute budget is exceeded, closing the distilled dataset.

16. The system of claim 13, wherein the non-deterministic feature neural network training kernel is the NNGP.

17. A method for performing dataset distillation for preserving data privacy:

sampling a batch of data from a dataset to form a coreset;

applying a non-deterministic feature neural network training kernel approximation to at least some portion of the coreset to define a modified coreset;

generating a distilled dataset from the modified coreset, the distilled dataset comprising data that is synthetic and representative of the dataset; and returning the distilled dataset for preserving data privacy during run-time use in cloud infrastructures and local software as a service (SaaS) applications, wherein the non-deterministic feature neural network training kernel is at least one of a neural network Gaussian process (NNGP) kernel, a neural tangent kernel (NIK), or other learned training kernels.

18. The method of claim 17, wherein the dataset comprises a large dataset exceeding approximately $10^4$ samples, with each sample being of dimensionality of approximately $10^3$ or larger.

19. The method of claim 17, further comprising:

applying Platt-scaling to the modified coreset to define a Platt-scaled coreset, wherein generating the distilled dataset from the modified coreset further comprises generating the distilled dataset from the Platt-scaled coreset.

20. The method of claim 17, further comprising returning the distilled dataset for use in data privacy-preserving machine-learning-model training.

* * * * *